(12) United States Patent
Harrison et al.

(10) Patent No.: US 10,942,596 B2
(45) Date of Patent: Mar. 9, 2021

(54) TOUCH-SENSING SYSTEM

(71) Applicant: Carnegie Mellon University, Pittsburgh, PA (US)

(72) Inventors: Christopher Harrison, Pittsburgh, PA (US); Yang Zhang, Pittsburgh, PA (US); Gierad Laput, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 16/339,334

(22) PCT Filed: Oct. 3, 2017

(86) PCT No.: PCT/US2017/054999
§ 371 (c)(1),
(2) Date: Apr. 3, 2019

(87) PCT Pub. No.: WO2018/067613
PCT Pub. Date: Apr. 12, 2018

(65) Prior Publication Data
US 2019/0227667 A1    Jul. 25, 2019

Related U.S. Application Data

(60) Provisional application No. 62/496,072, filed on Oct. 3, 2016.

(51) Int. Cl.
*G06F 3/041*    (2006.01)
*G06F 3/0488*   (2013.01)
*G06F 3/046*    (2006.01)

(52) U.S. Cl.
CPC .......... *G06F 3/0416* (2013.01); *G06F 3/046* (2013.01); *G06F 3/0488* (2013.01); *G06F 2203/04103* (2013.01)

(58) Field of Classification Search
CPC ...... G06F 3/0416; G06F 3/044; G06F 3/0443; G06F 3/0444; G06F 3/0445;
(Continued)

(56) References Cited

U.S. PATENT DOCUMENTS

| 4,293,734 A | 10/1981 | Pepper, Jr. |
| 4,371,746 A | 2/1983 | Pepper, Jr. |

(Continued)

FOREIGN PATENT DOCUMENTS

| WO | WO 2002/021432 | 3/2002 |
| WO | WO 2017095861 | 6/2017 |
| WO | WO 2018/067613 | 4/2018 |

OTHER PUBLICATIONS

Adler et al., "Electrical impedance tomography: regularized imaging and contrast detection," IEEE Transactions on Medical Imaging, 1996 15(2): 170-179.

(Continued)

*Primary Examiner* — Tom V Sheng
(74) *Attorney, Agent, or Firm* — Fish & Richardson P.C.

(57) ABSTRACT

A method for a touch sensing system includes generating, by a first pair of electrodes at a first location in a conductive material, an electric field in the conductive material; generating measurement data by measuring, by one or more second pairs of electrodes, the electric field in the conductive material at one or more second locations in the conductive material, with each of the one or more second locations differing from the first location; generating, based on the measurement data, an approximation of the electric field in the conductive material; and classifying, based on the approximation, one or more regions of the interface into a given state.

20 Claims, 30 Drawing Sheets

(58) Field of Classification Search
CPC ........ G06F 3/0446; G06F 3/045; G06F 3/046;
G06F 3/0488; G06F 2203/04103; G06F
2203/04104
See application file for complete search history.

(56) References Cited

U.S. PATENT DOCUMENTS

| | | | |
|---|---|---|---|
| 4,622,437 | A | 11/1986 | Bloom et al. |
| 4,806,709 | A | 2/1989 | Evans |
| 6,650,319 | B1 | 11/2003 | Hurst et al. |
| 7,660,617 | B2 | 2/2010 | Davis |
| 8,780,066 | B2 | 7/2014 | Christiansson |
| 8,803,848 | B2 | 8/2014 | Suarez Rovere |
| 9,250,794 | B2 | 2/2016 | Suarez Rovere |
| 9,377,884 | B2 | 6/2016 | Christiansson |
| 9,411,444 | B2 | 8/2016 | Christiansson |
| 9,529,483 | B2* | 12/2016 | Qin ........................ G06F 3/041 |
| 9,639,210 | B2 | 5/2017 | Wallander |
| 9,684,414 | B2 | 6/2017 | Christiansson |
| 10,146,361 | B2* | 12/2018 | Siska .................. H03K 17/962 |
| 2003/0121766 | A1* | 7/2003 | Chen ..................... G06F 3/0412 200/310 |
| 2008/0309622 | A1 | 12/2008 | Krah |
| 2009/0135146 | A1* | 5/2009 | Scholz ..................... G06F 3/044 345/173 |
| 2009/0166097 | A1* | 7/2009 | Chang .................... G06F 3/044 178/18.03 |
| 2009/0225051 | A1* | 9/2009 | Kuo ........................ G06F 3/044 345/173 |
| 2010/0259503 | A1* | 10/2010 | Yanase ................. G06F 3/0444 345/174 |
| 2010/0271312 | A1 | 10/2010 | Alameh et al. |
| 2010/0315374 | A1* | 12/2010 | Chen ....................... G06F 3/044 345/174 |
| 2011/0134060 | A1 | 6/2011 | Sung et al. |
| 2011/0285661 | A1* | 11/2011 | Hotelling .............. G06F 3/0418 345/174 |
| 2012/0043976 | A1 | 2/2012 | Bokma et al. |
| 2013/0201142 | A1 | 8/2013 | Suarez Rovere |
| 2013/0307795 | A1* | 11/2013 | Suarez Rovere ... G06F 3/04166 345/173 |
| 2014/0354583 | A1* | 12/2014 | Tokutake .............. G06F 3/0488 345/174 |
| 2014/0365009 | A1* | 12/2014 | Wettels .................. B25J 9/1612 700/258 |
| 2015/0177980 | A1* | 6/2015 | Yanase ................ G06F 3/04883 345/174 |
| 2016/0070416 | A1 | 3/2016 | Wassvik |
| 2018/0113527 | A1* | 4/2018 | Klein .................. G06F 3/03543 |
| 2018/0224966 | A1* | 8/2018 | Church ............... G06F 3/03547 |

OTHER PUBLICATIONS

Akaoka et al., "Display Objects: prototyping functional physical inter-faces on 3d styrofoam, paper or cardboard models," Proceedings of the fourth international conference on Tangible, embedded, and embodied interaction, 2010, 49-56.
Alirezaei et al., "A tactile distribution sensor which enables stable measurement under high and dynamic stretch," Proc. IEEE Symp. 3D User Inter., Mar. 2009, 87-93.
Cohn et al., "An ultra-low-power human body motion sensor using static electric field sensing," Proceedings of the 2012 ACM Conference on Ubiquitous Computing, 2012, 99-102.
Cohn et al., "Your noise is my command: sensing gestures using the body as an antenna," Proceedings of the SIGCHI Conference on Human Factors in Computing Systems, 2011, 791-800.
David Holman et al., "TactileTape: low-cost touch sensing on curved surfaces," In Proceedings of the 24th annual ACM symposium adjunct on User interface software and technology, 2011, 17-18.
Electrical Impedance Tomography, Methods, History and Applications, Institute of Physics Publishing, 2005, 12 pages.

FreeScale.com [online], "Freescale Semiconductor," Nov. 2012, retrieved on Aug. 29, 2019, retrieved from URL http://cache.freescale.com/files/32bit/doc/data_sheet/K20P64M72SF1.pdf, 67 pages.
Goe et al., "A low-cost transparent electric field sensor for 3d interaction on mobile devices," Proceedings of the SI GCHI Conference on Human Factors in Computing Systems, 2014, 3167-3170.
Hall et al., "The WEKA data mining software: an update," ACM SIGKDD Explorations Newsletter, 2009, 11 (1):10-18.
Hudson et al., "Rapid construction of functioning physical interfaces from cardboard, thumbtacks, tin foil and masking tape," Proceedings of the 19th annual ACM symposium on User interface software and technology, 2006, 289-297.
Hwang et al., "A Polymer-Based Flexible Tactile Sensor for Both Normal and Shear Load Detections and Its Application for Robotics," Journal of Micromechanical Systems 16(3):556-563.
Jain et al., "Electrical Impedance Tomography of Complex Conductivity Distributions with Noncircular Boundary," IEEE Transactions on Biomedical Engineering, 44(11):1051-1060.
Laput et al., "Acoustruments: Passive, Acoustically-Driven, Interactive Controls for Handheld Devices," Proceedings of the 33rd Annual ACM Conference on Human Factors in Computing Systems, 2015, 2161-2170.
Lazzaroni et al., "Active monitoring apparatus for underground pollutant detection based on electrical impedance tomography," In Proc. IMTC '02, 2002, IEEE Cat. No. OOCH37276: 577-579.
Moeller et al., "Zero Touch: an optical multi-touch and free-air interaction architecture," Proceedings of the SIGCHI Conference on Human Factors in Computing Systems, 2012, 2165-2174.
Mujibiya et al., "Mirage: exploring interaction modalities using off-body static electric field sensing," In Proceedings of the 26th annual ACM symposium on User interface software and technology, 2013, 211-220.
Orth et al., "Fabric computing interfaces," In CHI 98 Conference Summary on Human Factors in Computing Systems, 1998,, 331-332.
PCT International Search Report and Written Opinion in corresponding Application No. PCT/US2017/054999, dated Dec. 12, 2017, 11 pages.
Poupyrev et al., "Project Jacquard: Interactive Digital Textiles at Scale," Proceedings of the 2016 CHI Conference on Human Factors in Computing Systems, 2016, 4216-4227.
Poupyrev et al., "Touche: touch and gesture sensing for the real world," Proceedings of the 2012 ACM Conference on Ubiquitous Computing, 2012, 536-536.
Pugach et al., "Neural learning of the topographic tactile sensory information of an artificial skin through a self-organizing map," Advanced Robotics, Oct. 12, 2015, 29(21):1393-1409.
Savage et al., "Makers' Marks: Physical Markup for Designing and Fabricating Functional Objects," Proceedings of the 28th Annual ACM Symposium on User Interface Software & Technology, 2015, 103-108.
Savage et al., "Midas: fabricating custom capacitive touch sensors to prototype interactive objects," Proceedings of the 25th annual ACM symposium on User interface software and technology, 2012, 579-588.
Savage et al., "Sauron: embedded single-camera sensing of printed physical user interfaces," Proceedings of the 26th annual ACM symposium on User interface software and technology, 2013, 447-456.
Savage, "Lamello: Passive Acoustic Sensing for Tangible Input Components," Proceedings of the 33rd Annual ACM Conference on Human Factors in Computing Systems, 2015, 1277-1280.
Schmitz et al., "Capricate: A Fabrication Pipeline to Design and 3D Print Capacitive Touch Sensors for Interactive Objects," Proceedings of the 28th Annual ACM Symposium on User Interface Software & Technology, 2015, 253-258.
Shaw et al., "Makey Makey: improvising tangible and nature-based user interfaces," In Proceedings of the Sixth International Conference on Tangible, Embedded and Embodied Interaction, 2012, 367-370.
Smith, "Electric field imaging," Ph.D Dissertation. Massachusetts Institute of Technology, 1995, 216 pages.

(56) References Cited

OTHER PUBLICATIONS

Smith, "Toward Electric Field Tomography," M.S. Thesis. Massachusetts Institute of Technology, 1995, 55 pages.
Tawil et al., "Touch Modality Interpretation for an EIT-Based Sensitive Skin," Proc. IEEE Int. Conf. Robot. Autom., May 2011, 3770-3776.
Tawil et al., "Electrical Impedance Tomography for Artificial Sensitive Robotic Skin: A Review," in IEEE Sensors Journal, Apr. 2015, 15(4):2001-2016.
TheVerge.com [online] "LG Made an 18-inch Display You Can Roll Up Like a Newspaper," Jan. 3, 2016, retrieved on Aug. 12, 2019, retrieved from URL http://www.theverge.com/201611/3/10706180/lg-rollable-display-flexible-screenannounced-ces-2016.
Willis et al., "Printed optics: 3D printing of embedded optical elements for interactive devices," Proceedings of the 25th annual ACM symposium on User interface software and technology, 2012, 589-598.
Wimmer et al., "Modular and deformable touch-sensitive surfaces based on time domain reflectometry," Proceedings of the 24th annual ACM symposium on User interface software and technology, 2011, 517-526.
Zhang et al., "Electrick: Low-Cost Touch Sensing Using Electric Field Tomography," Proceedings of the 2017 CHI Conference on Human Factors in Computing Systems, 2017, 1-14.
Zhang et al., "Low-Cost Electrical Impedance Tomography for Hand Gesture Recognition," Proceedings of the 28th Annual ACM Symposium on User Interface Software & Technology, 2015, 167-173.
EP Search Report in European Appln. No. 17859053.5, dated May 29, 2020, 10 pages.
Nagakubo et al., "A deformable and deformation sensitive tactile distribution sensor," Proceedings of the 2007 IEEE International Conference on Robotics and Biomimetrics, Dec. 15-18, 2007, 1301-1308.
Post et al., "Scalable Interactive Surfaces via Charge Source Tomography," Development by Design—DYD02, Dec. 2, 2002, 1-2.
Silvera-Tawil et al., "Electrical Impedance Tomography for Artificial Sensitive Robotic Skin: A Review," IEEE Sensors Journal, Apr. 2015, 15(4):2001-201.

* cited by examiner

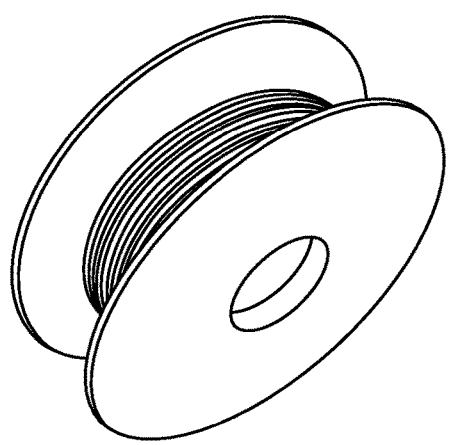
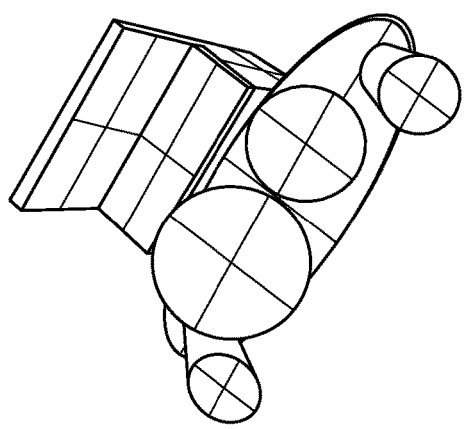
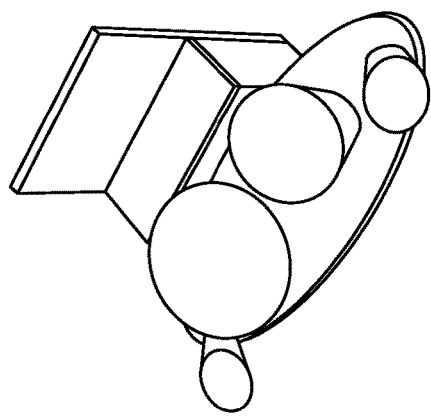
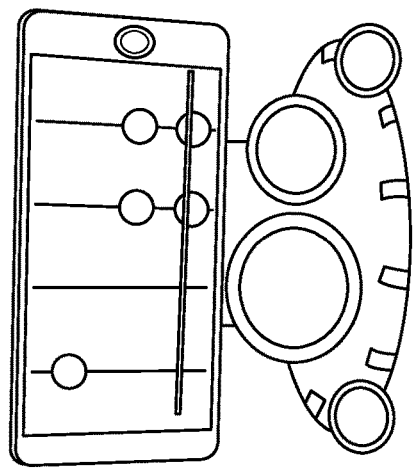
FIG. 5

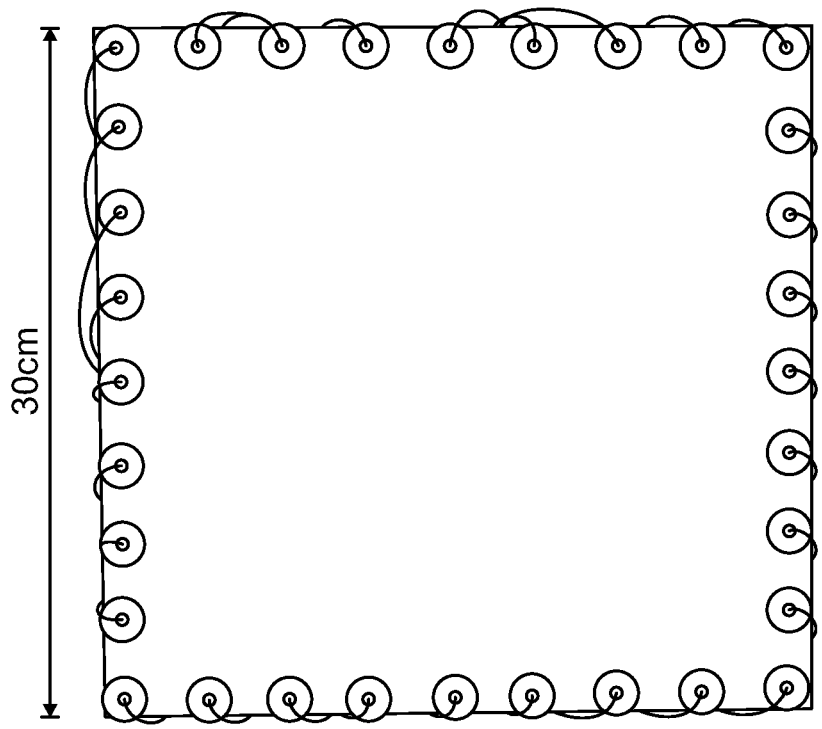
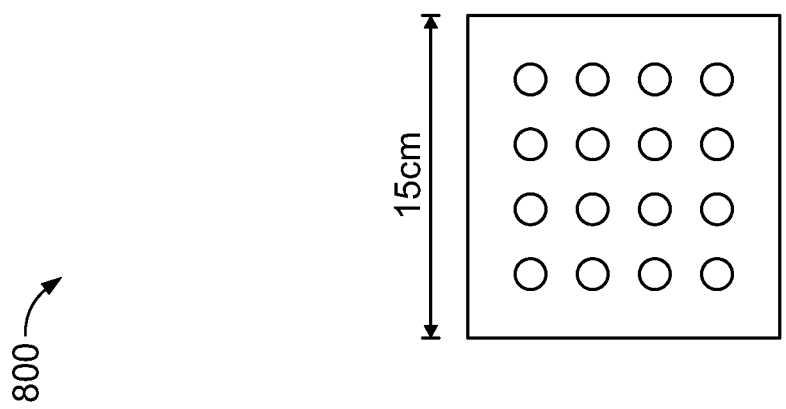
FIG. 8

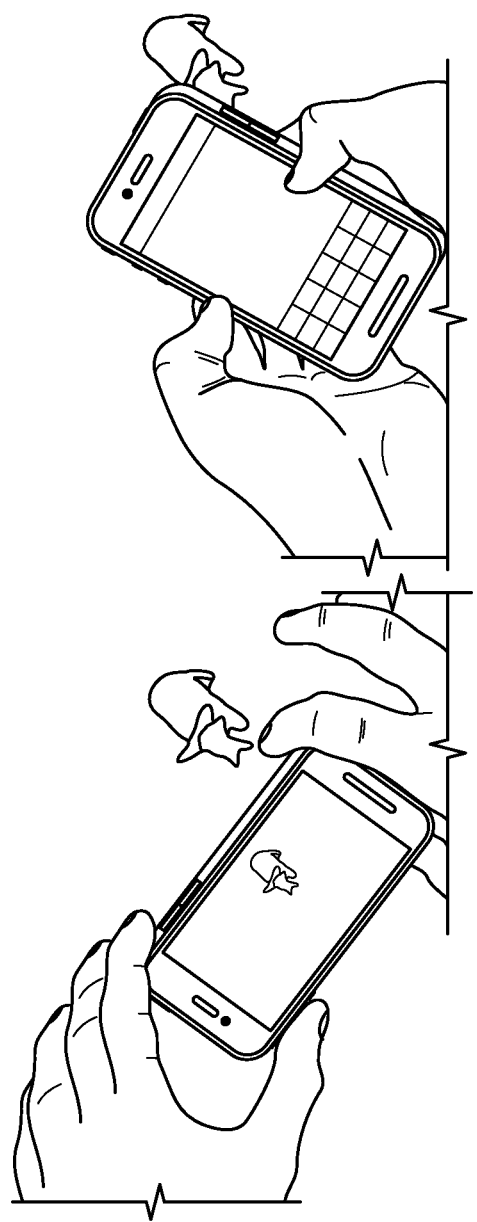
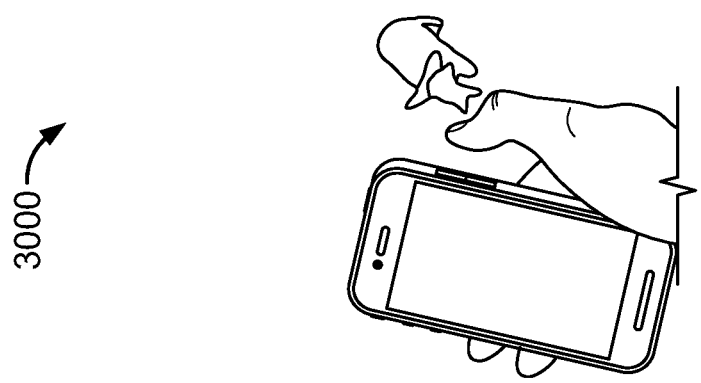
FIG. 30

TOUCH-SENSING SYSTEM

CLAIM OF PRIORITY

CROSS-REFERENCE TO RELATED APPLICATION

This application is a 35 U.S.C. § 371 National Stage Application of PCT/US2017/054999, filed Oct. 3, 2017, which, in turn, claims the benefit of priority under 35 U.S.C. § 119(e) to provisional U.S. Patent Application No. 62/496,072, filed Oct. 3, 2016, the entire contents of each of which are hereby incorporated by reference.

BACKGROUND

Touchscreen technologies are generally manufactured on a rigid substrate. For example, projective capacitive sensing, like that used in contemporary smartphones, uses a multi-layered, row-column matrix most often deposited onto glass. This means that most touch panels are relatively small and flat. In cases where irregular shapes or large areas have been made touch sensitive, the price tag is often significant—touchscreens above 75" typically cost thousands of dollars, and complex or flexible objects with touch-sensing capabilities are mostly research prototypes unavailable to consumers. The high cost and inflexibility has limited touch interaction from being adopted by a wider array of everyday objects, despite touch being an intuitive and popular input modality.

Researchers have developed a myriad of approaches to enable touch-screen-like interactions on ad hoc objects and surfaces, ideally with minimal instrumentation of either the object itself or the environment.

The most prevalent way to achieve this level of fidelity (at scale) is through computer vision. Early systems used conventional cameras segmenting e.g., skin color, motion or shadows. Another option is to super-size touchscreen technologies to room scale; for example, an augmented floor with FTIR sensing. Depth cameras have been a notable boon, easing the previously complex task of segmenting user inputs from a background scene.

Acoustic methods can also be used. Multi-sensor approaches, chiefly based on time difference of arrival techniques, can enable touch sensing on large surfaces, including windows, wall and desks. Passive acoustics can also be used to capture and recognize non-spatial gestures. Many of these approaches can also be applied to discrete objects. For example, a pair of piezoelectric elements in an emitter-receiver configuration, allowing discrete touch locations on ad hoc objects to be trained and recognized.

Electrical methods are the least common. One option is to detect touch locations in an environment by passively capturing ambient electromagnetic noise that couples to users when they are near to a noise source (e.g., a power line behind a wall). Active approaches are also possible. For example, a capacitive, flexible, touch-sensing tape can be used that is affixed to objects.

Materials can be created with special, integrated features that enable touch capabilities. These are not ad hoc objects per se, but rather augmented versions of everyday materials. The most common target for these efforts has been textiles. Through silk-screening or weaving of conductive materials, sensing of discrete touch locations and multi-touch inputs is possible. Most projects utilize capacitive sensing, though other techniques, such as time domain reflectometry, have also been applied.

SUMMARY

The systems and methods of the touch sensing system described herein provide a low-cost and versatile sensing technique that enables touch input on arbitrary surfaces, whether large or irregular. In some implementations, this is achieved by using electric field tomography sensing in concert with an electrically conductive layer that can be easily and cheaply added to objects and surfaces. The touch sensing system can be applied to both rigid and pliable objects with both regular and irregular geometries. The touch sensing system can be interfaced with everyday objects to make them touch-enabled objects. For example, the touch sensing system described herein can be applied to automotive parts, 3D printed objects, furniture, floors, walls, ceilings, etc. The touch-enabled interfaces of these objects can be small, on the order of a dozen centimeters square, or large, on the order of several meters square. The touch-enabled surfaces of these objects can be directly touched. The touch sensing system can be concealed beneath an outer layer of the object, such as a coat of paint, a sheet of fabric, a piece of paper, etc. to preserve an aesthetic appeal of the touch-enabled object.

The touch sensing system includes electrodes in contact with the conductive substrate, which covers the desired interactive area, to inject a small current. This results in an electric field distributed inside the substrate. The electrodes can be attached anywhere on the substrate. For the simplicity of deployment, our system attaches electrodes to the periphery of conductive substrate. When a user's finger touches on the desired interactive area, it draws a fraction of the current to the ground. This results in a distortion in the electric field distribution, which can be sensed using the electrodes. Greater details of this sensing principle will be described below. The sensor data is transmitted wirelessly, allowing the sensors and board to be fully contained within an object and eliminating the need for external sensing infrastructure (e.g., depth cameras).

The systems and methods described herein are related to Electrical Impedance Tomography (EIT). Note that EIT has other names such as Electrical Resistance Tomography (ERT), or Electrical Capacitance Tomography (ECT). Here, the term EIT is used to represent all systems that utilize on electrical changes to reconstruct an image of the interior structure of an object by sensing non-invasively from the exterior surface. EIT applications include respiratory monitoring, underground detection, and biological inspection. In the human computer interaction domain, the technology can be used in a hand-gesture-sensing smartwatch.

In some implementations, EIT can be used in conjunction with materials that alter their local impedance when pressure is applied by a finger such as piezo-resistive films, multi-layer meshes, and tactile sensor arrays. For example, EIT can be used to create touch sensitive skins for robots. Irregular geometries are supported, though no prior work has demonstrated scalability beyond roughly 0.5 m².

Although the systems and methods described herein comprise tomography, the sensing principles are very different from standard EIT—the methods and systems do not sense changes in a material substrate (impedance in the case of EIT), but is rather can be based on a user's finger shunting injected current, further described in greater detail below. This sensing mechanism enables use of leverage very different materials for the conductive domain, which in turn entails different fabrication methods and use cases not previously contemplated due to difficulty and cost.

The systems and methods described herein are related to Electric Field (EF) sensing. EF sensing generally uses the air as a medium, enabling free-space interactions such as finger tracking, motion sensing, and activity recognition. In short, when a user (who represents a large charge sink) enters the sensed area, the EF current distribution is disturbed. The system deduces the position of a disturbance by using measurements from electrodes (e.g., peripheral electrodes). Systems typically perform the localization through regression, rather than tomographic reconstruction.

Additionally, the last decade has seen tremendous growth in digitally-augmented, rapid fabrication tools, especially for human computer interaction uses such as prototyping enclosures, controllers and new computing form factors. However, the output from these tools, such as CNC milling machines, laser cutters, vacuum formers and 3D printers are static—output embodies the desired 3D form, but rarely the interactivity of the end product. Ideally, designers should be able to prototype both in the same medium.

A variety of approaches have been considered that aim to alleviate this interactive divide. For example, DisplayObjects detects touch input on passive prototyped objects by tracking fingers using an external camera array. Also using computer vision, Makers Marks allows users to annotate objects that have been created with stickers, which denote the location of desired functionality (e.g., joystick here); after 3D scanning and processing, the final functional object can be 3D printed and assembled by non-experts.

Due to its non-mechanical nature, capacitive sensing is a powerful and popular technique for prototyping or retrofitting touch input. Hudson and Mankoff demonstrate rapid construction of functional physical interfaces using just "cardboard, thumbtacks, tin foil and masking tape." Midas provides an entire workflow for authoring and fabricating (using a CNC vinyl cutter) complex capacitive layouts, which can be adhered to complex objects. The aforementioned capacitive tape can also be used in a prototyping context.

Owing to 3D printing's versatility, a variety of disparate methods have been explored to enable interactive printed output. For example, by 3D printing integrated cavities, tubes, tines and other mechanical structures, active and passive acoustics can be used to digitize user input. Sauron uses an internal camera and computer vision, along with accessory mirrors and markers, to capture user input to mechanical controls on 3D printed items. It is also possible to 3D print light pipes, which can route optically driven touch input to e.g., a photodiode. Similarly, it is possible to 3D print conductive material, enabling direct integration of capacitive sensing electrodes into a model.

The systems and methods described herein are applied to not only to laser cut and 3D printed objects with a mechanism different than the related techniques described, but also prototypes made from ceramic, wood, plastic and other common non-conductive materials. The systems and methods described herein also enable directly 3D print touch-capable objects using a low-cost filament.

The systems and methods described herein are be used for a number of examples including those with large and irregular shapes, including flexible surfaces, traditionally not achievable with the current touch-sensing systems. The systems and methods described herein can scale to large surfaces such as walls and furniture. Additionally, the systems and methods described herein can bring touch interactivity to rapidly prototyped objects, enabling rapid iteration of both form and function. The systems and methods described herein enable new interactive opportunities on a diverse set of objects and surfaces that were previously static.

The touch sensing system includes generating, by a first pair of electrodes at a first location in a conductive material, an electric field in the conductive material; generating measurement data by measuring, by one or more second pairs of electrodes, the electric field in the conductive material at one or more second locations in the conductive material, with each of the one or more second locations differing from the first location; generating, based on the measurement data, an approximation of the electric field in the conductive material; and classifying, based on the approximation, one or more regions of the interface into a given state. The function of the preamble is to set forth the general technical environment of the invention.

The method of the touch sensing system includes, in response to generating the measurement data, selecting one of the one or more second pairs of electrodes for generating another electric field in the conductive material; generating additional measurement data, using the first pair of electrodes and the one or more second pairs of electrodes that were not selected; and combining the measurement data with the additional measurement data to generate cross-sectional measurement data; where the approximation of the electric field is based on the cross-sectional measurement data.

In some implementations, generating the measurement data includes a tomographic reconstruction of the electric field throughout the touch interface. In some implementations, the interface is a touch interface configured to receive a touch input. In some implementations, the given state represents one of a touched state or a not-touched state. In some implementations, the given state represents a tracking of a continuous touch.

In some implementations, classifying includes applying a first regression model for a first dimension of the interface and applying a second regression model for a second dimension of the interface. In some implementations, classifying the one or more regions includes determining a location of a disturbance in the electric field of the interface that causes the electric field to diverge at the location of the disturbance from a baseline electric field of the interface. The disturbance in the electric field is caused by a shunted electric current at the location of the disturbance.

In some implementations, the method of the touch sensing system includes determining the baseline electric field of the interface by obtaining the measurement data when the interface is not being touched.

In some implementations, classifying the one or more regions includes executing a neural network to perform operations including: receiving feature input data including the measurement data, where the feature inputs each comprise a sample of the measurement data; receiving weights based on a calibration measurement of the conductive material, the weights each representing a value of the electric field in the conductive material at a location in the conductive material when the conductive material is not being disturbed; combining, at each stage of the neural network, each of the feature inputs with one or more of the weights to generate output data; and applying a classifier to the output data. In some implementations, classifying the one or more regions includes executing a support vector machine, where one or more features of the support vector machine comprise the measurement data.

In some implementations, the conductive material includes a surface coat material having a resistivity between 500Ω and 50MΩ. In some implementations, the conductive material includes one of a carbon-loaded thermoplastic polymer, carbon-loaded silicone, or a carbon-loaded polymeric foil.

In some implementations, the method of the touch sensing system includes include multiplexing the first pair of electrodes and one or more second pairs of electrodes between a current generating state and a voltage measuring state. In some implementations, the actions include tracking, based on the classifying, intermittent touch of the interface to approximate a continuous touch. In some implementations, the actions include determining, based on the classifying, that two or more regions of the interface are simultaneously in a touched state. In some implementations, at least one portion of the interface includes a curved surface.

In some implementations, the touch sensing system includes a conductive material forming a touch interface; a plurality of electrodes affixed to the conductive material; a multiplexing device configured to switch a state of electrodes of the plurality between a current-projecting functionality state and a voltage measuring functionality state; a signal generator; and one or more data processing devices configured to perform operations including: causing the multiplexing device to switch a pair of electrodes of the plurality from the voltage measuring functionality state to the current-projecting functionality state; controlling the signal generator to generate, via the pair of electrodes, an electric field in the conductive material; measuring, via one or more pairs of the electrodes of the plurality in the voltage measuring functionality state, one or more voltages representing the electric field in the conductive material to generate cross-sectional measurement data; reconstructing, based on the cross-sectional measurement data, an approximation of the electric field in the conductive material; and classifying, based on the approximation, one or more regions of the touch interface of the conductive material into one of a touched state or a not-touched state.

In some implementations, the conductive material includes a surface coat material having a resistivity between 500Ω and 50MΩ. In some implementations, the conductive material includes one of a carbon-loaded thermoplastic polymer, carbon-loaded silicone, or a carbon-loaded polymeric foil. In some implementations, the conductive material includes a bulk material with a resistivity of 10 kΩ-50MΩ.

In some implementations, the actions include obtaining a substrate; applying a conductive layer to the substrate; affixing a plurality of electrodes to the conductive layer; and calibrating a processing device in communication with the plurality of electrodes by performing operations including: causing, via a pair of the electrodes of the plurality, an electric field in the conductive material, when the conductive material and the substrate are in a not-touched state; measuring, via one or more additional pairs of the electrodes of the plurality, the electric field in the conductive material to generate cross-sectional measurement data; generating, based on the cross-sectional measurement data, an approximation of a baseline electric field of the touch interface of the conductive material; and storing the approximation of the baseline electric field in a memory of the processing device.

In some implementations, obtaining the substrate includes forming the substrate by one or more additive manufacturing processes. In some implementations, applying a conductive layer to the substrate includes spraying the conductive layer on the substrate. In some implementations, applying a conductive layer to the substrate includes powder coating the conductive layer on the substrate. In some implementations, applying a conductive layer to the substrate includes vacuum forming the conductive layer on the substrate. In some implementations, calibrating a processing device in communication with the plurality of electrodes includes executing a machine learning process and where generating the approximation of the baseline electric field comprises training the machine learning process with training data representing a baseline electric field.

In some implementations, the touch sensing system includes one or more processing devices in communication with a plurality of electrodes, the one or more processing devices configured to perform operations including: generating, by a first pair of electrodes at a first location in a conductive material, an electric field in the conductive material; generating measurement data by measuring, by one or more second pairs of electrodes, the electric field in the conductive material at one or more second locations in the conductive material, with each of the one or more second locations differing from the first location; generating, based on the measurement data, an approximation of the electric field in the conductive material; and classifying, based on the approximation, one or more regions of the interface into a given state.

In some implementations, the touch sensing system includes a non-transitory computer readable medium storing instructions configured to cause a computing system to perform operations including generating, by a first pair of electrodes at a first location in a conductive material, an electric field in the conductive material; generating measurement data by measuring, by one or more second pairs of electrodes, the electric field in the conductive material at one or more second locations in the conductive material, with each of the one or more second locations differing from the first location; generating, based on the measurement data, an approximation of the electric field in the conductive material; and classifying, based on the approximation, one or more regions of the interface into a given state.

BRIEF DESCRIPTION OF THE DRAWINGS

FIG. 5 shows an example material for 3D printing a toy.

FIG. 8 shows evaluation templates (left) and testing panel for electrode count experiment (right).

FIGS. 28-30 show examples of touch-enabled objects.

DETAILED DESCRIPTION

Figure 1:
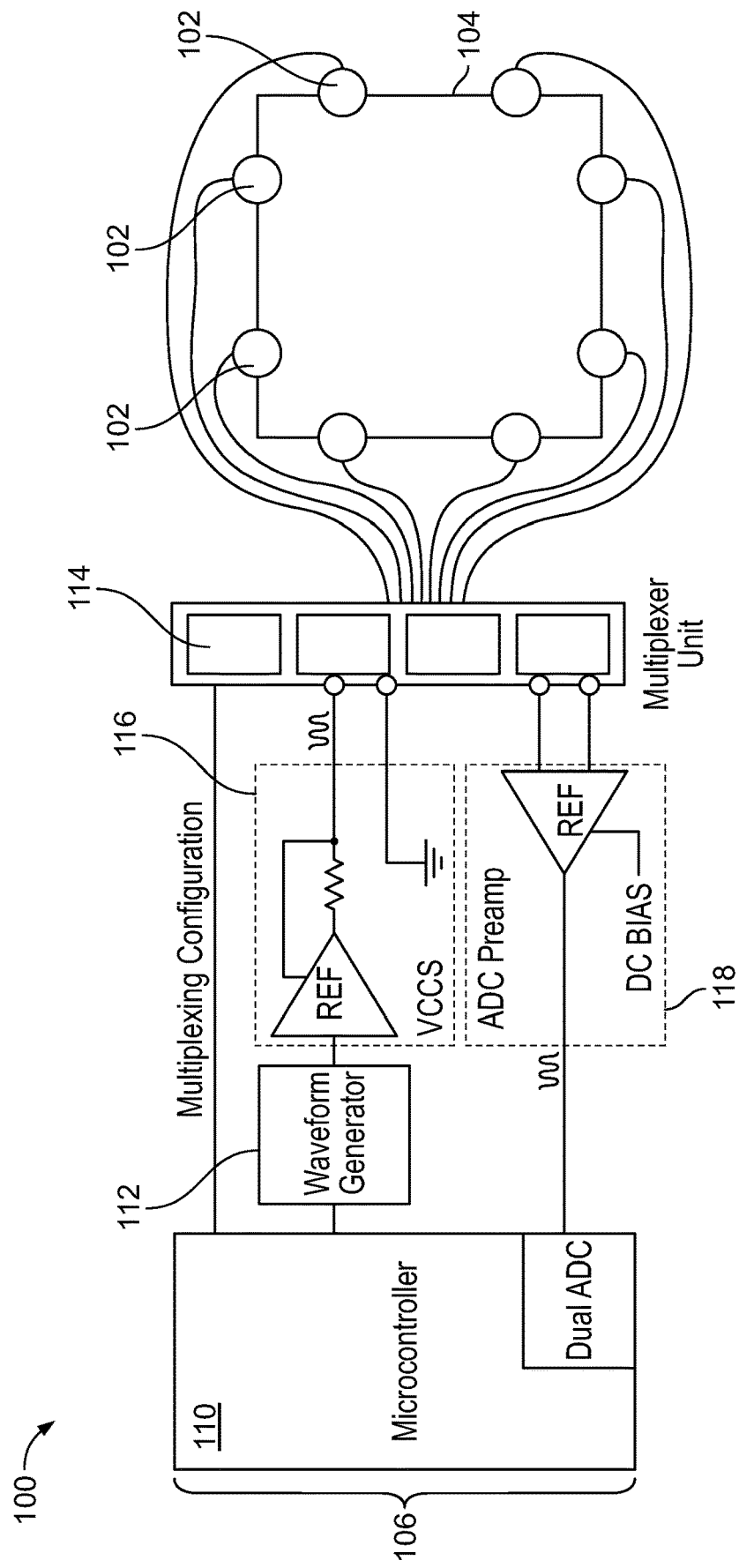
FIG. 1 shows a schematic view of the touch sensing system.

FIG. 1 shows a schematic view of a touch sensing device 100. The touch sensing device 100 is illustrated with eight electrodes 102, but other numbers of electrodes can be used, such as four, six, ten, twelve, fourteen, sixteen, thirty-two, and so forth. The electrodes 102 are affixed to a conductive material 104. The electrodes 102 are in communication with a data processing system 106 (e.g., a sensing board). The touch sensing system 100 shown in FIG. 1 is a representative system for illustrative purposes, but as described below, the touch sensing system can include conductive materials of irregular geometries manufactured from one or more of several materials. For example, the touch sensing system 100 can include electrodes 102 that are positioned on the conductive material 104 in a non-uniform manner. In some implementations, a touch interface of the touch sensing system 100, which is a portion of the conductive material 104, can be on any portion of the conductive material 104, and need not be surrounded by electrodes 102 on the periphery as shown in in FIG. 1.

The interface of the touch sensing system 100 includes any surface that is configured for being interacted with by a user of the touch sensing system. The interface of the touch sensing system includes a monolithic and contiguous interface, rather than a pattern. A pattern, for example, includes an array of touch-sensitive nodes or other discrete sensing devices, such as microelectronic devices, in the interface of the patterned system. Various approaches are used to determine a location of a touch input or several simultaneous touch inputs on the monolithic interface, such as tomography, as described below.

Figure 2:
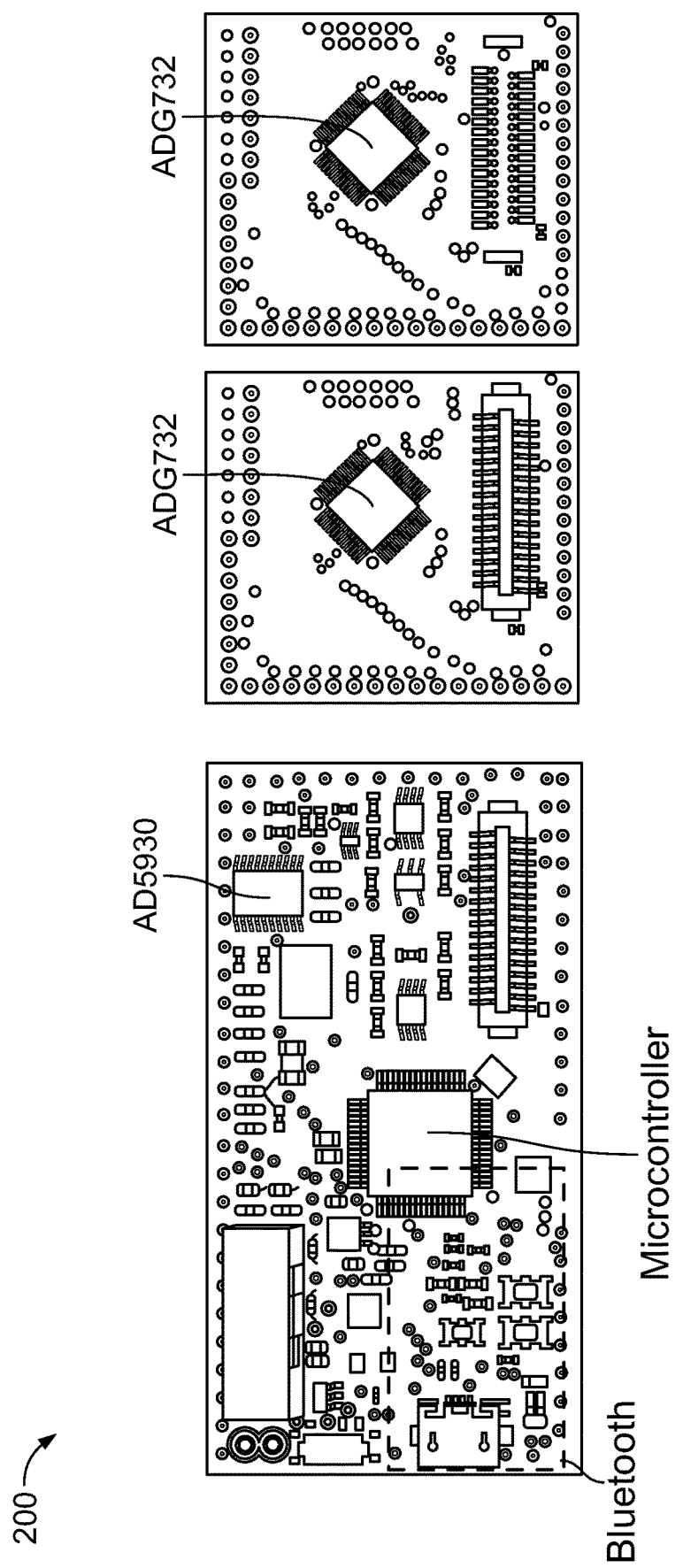
FIG. 2 shows example sensing boards.

An example of the data processing system 106 is shown in a schematic. The data processing system 106 can include a microcontroller 110, a waveform generator 112 (e.g., a signal generating device), and one or more multiplexers 114 in communication with the electrodes 102. For example, the data processing device 106 can be built around a Cortex M4 microcontroller 200 running at 96 MHz (MK20DX256VLH7), powered by Teensy 3.2 firmware, as shown in FIG. 2. The data processing system 106 includes a voltage controlled current source 116 (VCCS), direct digital synthesis (DDS) integrated circuit, and ADC preamplifier 118. The one or more multiplexers 114 enable cross-sectional measurements. In some implementations, the data processing system 106 can include a Bluetooth module to transmit data.

FIG. 2 shows examples 200 of sensing boards. A motherboard with the micro-processor is shown as well as two daughter boards with multiplexer units. An AD5930 DDS and an AD8220-based Voltage-controlled current source (VCCS) can be used to generate the electric field. In some implementations, the DDS is configured to output 200 kHz sinusoidal waves. The signal is then fed into the VCCS to output a constant AC current. The sensor can drive up to 6 Vpp to maintain constant AC current excitation, depending on the load impedance.

A pair of 32-to-1 multiplexers connect the VCCS terminals to two electrodes, forming a current-projecting electrode pair. Another pair of multiplexers connects two other electrodes (i.e. voltage-measuring pair) to the preamp buffer terminals. This electrode selection flexibility also affords us the flexibility to vary the number of electrodes used (chiefly 8, 16, or 32).

The measured signal can be amplified with a preamp to maximize the dynamic range of the ADC. In some implementations, a high pass filter is included with a 79.6 kHz cutoff to dampen ambient EM noise, such as fluorescent light ballasts (i.e. 50 kHz) and power-line noise (i.e. 60 Hz). The input signal is then biased by AVDD/2 (1.65 V) and sampled by the microcontroller's ADCs at 4 MHz with 12-bit resolution. Two ADCs in an interleaved DMA mode to achieve this high sampling rate by the data processing system 106.

The data processing system 106 is configured to select, by the multiplexers, a current-projecting electrode pair one or more voltage-measuring electrode pairs. The data processing system 106 is configured to pause 100 µs for the DC bias on the AC coupling capacitors to stabilize. The data processing system 106 then collects 200 samples (roughly 10 periods of the 200 kHz excitation signal) for a root-mean-square (RMS) computation. In some implementations, these foregoing steps constitute a single voltage measurement (taking ~137 µs in total). The data processing system 106 then selects the next voltage-measuring electrode pair, reconfiguring the multiplexers accordingly.

After the data processing system 106 collects all measurements in the current-projecting configuration, the data processing system 106 selects the next current-projecting pair and repeats the above procedure. Once the data processing system completes one frame of measurements, the cross sends the values over Bluetooth to a laptop for further processing. Table 1 notes an exemplary number of measurements used when using different electrode counts, which also defines the system frame rate. Other measurement counts can be used per frame, and different frame rates are possible.

TABLE 1

| | Number of Electrodes | | |
| --- | --- | --- | --- |
| | 8 | 16 | 32 |
| Number of Measurements req. per Frame | 40 | 208 | 928 |
| Sensing Frame Rate (Hz) | 181 | 35 | 8 |

Figure 3:
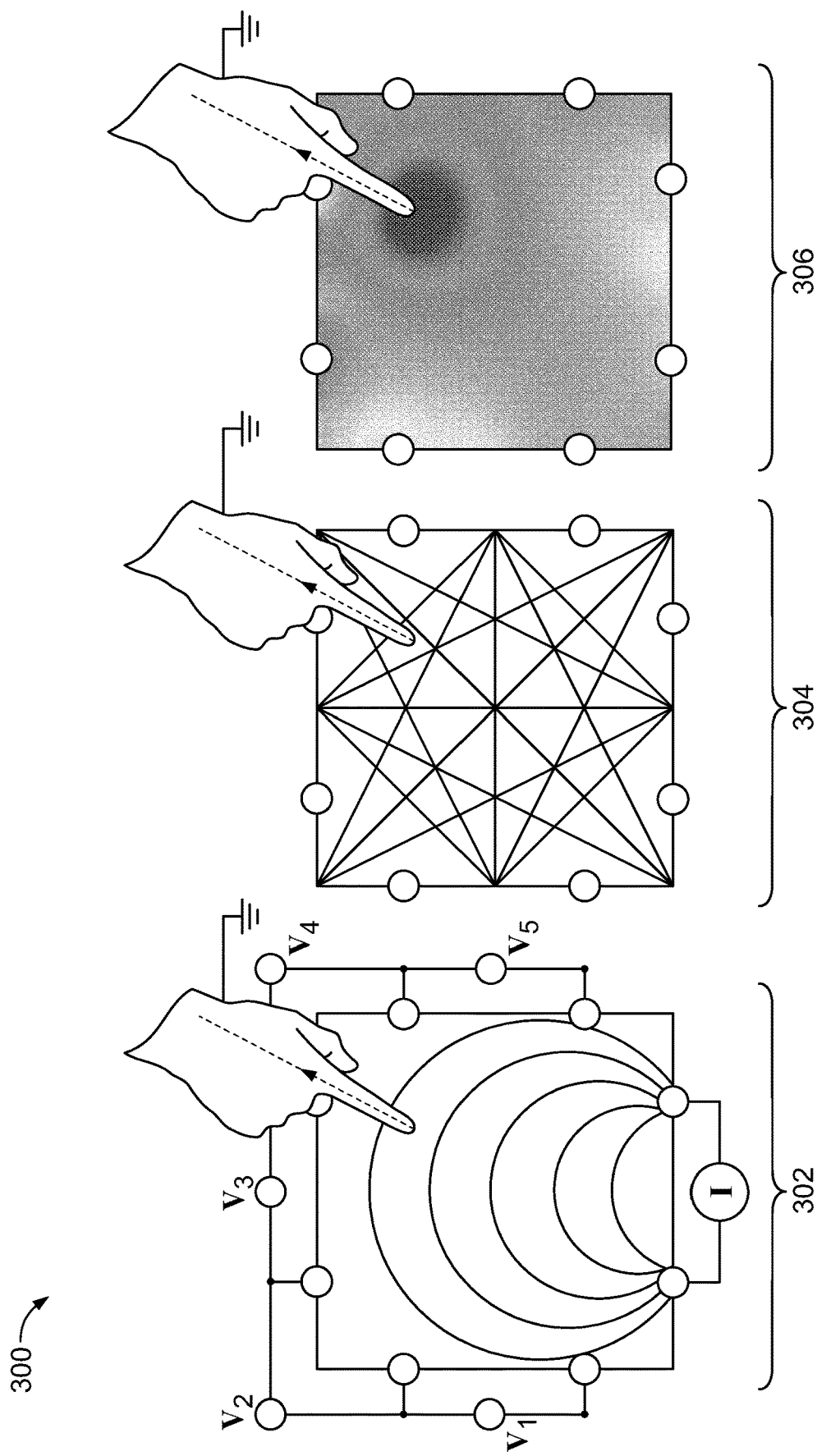
FIG. 3 shows a process for sensing touch by the touch sensing system.

FIG. 3 shows an example process 300 for sensing touch interactions with a touch interface comprising the conductive material 104. A current is inserted from one pair of electrodes and voltage from other pairs is measured. A mesh of cross-sectional measurements is taken. A reconstructed 2D touch-sensing image is created, where low and high current densities are shown. Low current densities are darker regions, which can be classified as "touched" regions. Lighter regains represent higher current densities, which can be classified as "not-touched" regions of the conducting material. The conductive material 104 is augmented with electrodes 102 placed on the conductive material (e.g., placed around the periphery of the desired interactive area). With this configuration, the touch sensing system performs a similar fundamental sensing operation as that used in four-pole EIT systems.

A small AC current is passed between a pair of adjacent electrodes (the emitter pair), creating an electric field in the conductive material, shown in diagram 302. The voltage difference is then measured at all other adjacent electrodes pairs (e.g., voltage-measurement pairs, receiver pairs, etc.). This process repeats for all combinations of emitter and receiver pairs, resulting in a mesh of cross-sectional measurements (e.g., measurement data), as shown in diagram 304.

In a conventional EIT system, this data would be used to estimate a 2D impedance distribution of an object interior, revealing regions with higher or lower impedance. However, as the coatings used in touch sensing system are homogenous, EIT is not applicable. Instead, the approach relies on the fact that a grounded object, such as a user's finger, will shunt some current to ground when it encounters an electric field (through capacitive coupling). The introduction of a charge sink distorts the electric field, characteristically altering the voltages measured at receiver pairs. The measurement data is then used to reconstruct the electric field distribution, which can recover the location of finger contacts, as shown in diagram 306. Since the system relies on capacitive coupling, it does not require a direct contact between a user's finger and the conductive substrate. This allows for a thin layer of non-conductive topcoat to be applied on the substrate for protection or atheistic purposes.

Selecting the correct resistivity for the surface is a crucial factor to the system's operation. If the resistivity is too high, the electric field will be very weak, making it hard to sense the field signal. However, if the surface resistivity is too low, the current shunted by the finger (a fairly high-impedance pathway) will be negligible, making changes hard to detect. In some implementations, the surface resistivity is approximately between 500Ω to 50 MΩ per square.

In some implementations, material classes include one or more of a sheet/film, extrudable plastic, and paint. The material can thus include one or more of bulk materials and films. In some implementations, a bulk material forms a part of the object (an object made up at least in part of conductive material, as opposed to coated in a conductive material). The material classes can be used for one or more fabrication and finishing processes, including laser cutting, stamping/pressing, 3D printing, vacuum forming, casting, blow molding, injection molding, powder coating and spray painting. In some implementations, the materials selected for the conductive material are low-cost materials including four key properties: 1) compatible electrical resistivity 2) non-toxicity 3) applied without exotic equipment or facilities, and 4) durable.

Figure 4:
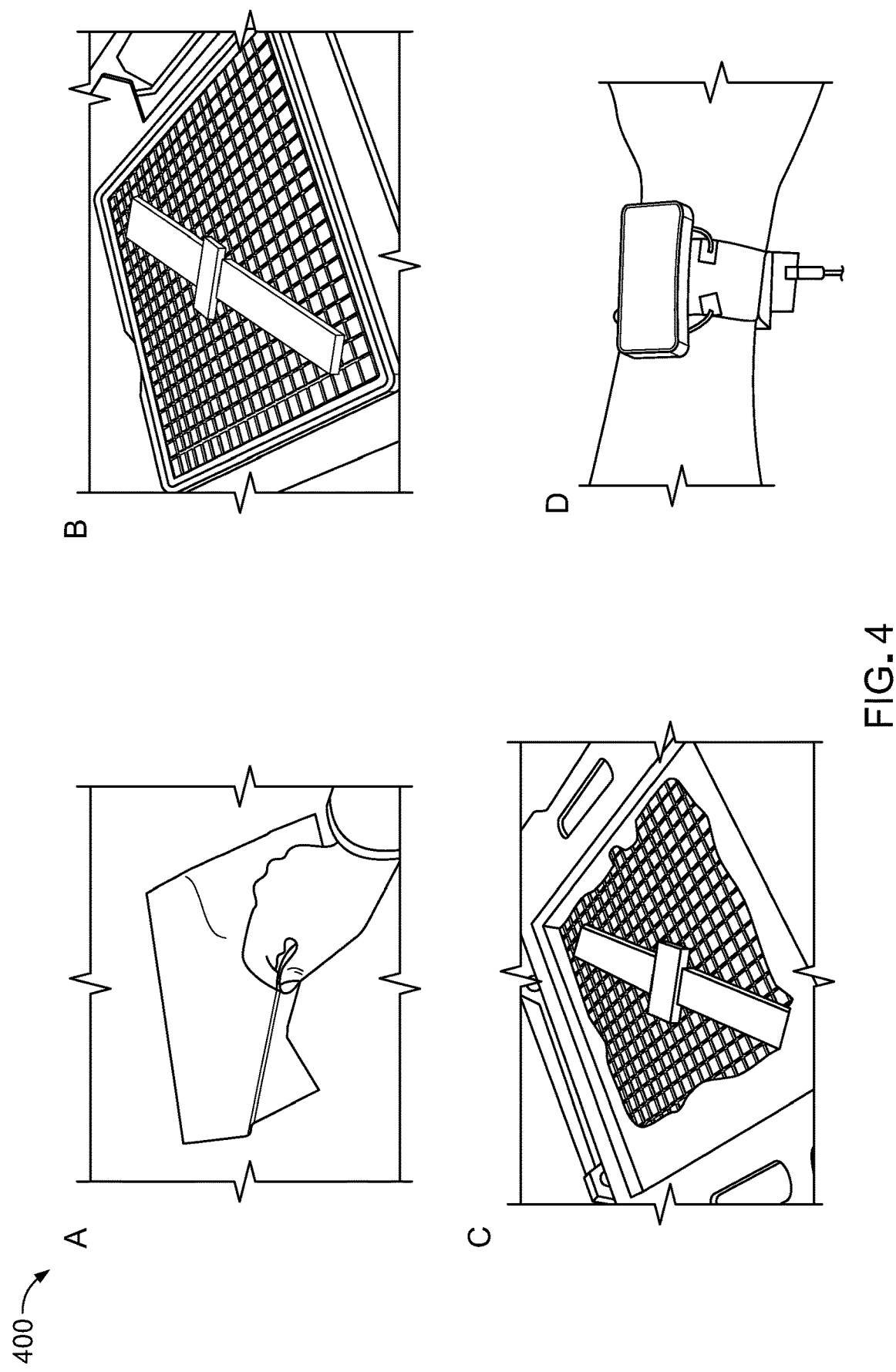
FIG. 4 shows an example material being vacuum-formed.

In some implementations, the conductive material includes a thermoplastic polymer. FIGS. 4A-4D show an example conductive material including Velostat, a carbon-loaded polyolefin sheet/film. It is primarily used for packaging of electronic components to mitigate electrostatic buildup. The volume resistivity of Velostat is roughly 500Ω·cm. A 4 mil thick, 3'×150' roll has a resistivity of 72 kΩ/sq and is obtained inexpensively. Velostat can be easily cut into different shapes (with e.g., scissors, laser cutter, vinyl cutter) and affixed to surfaces with adhesive. Velostat is highly flexible, and somewhat stretchable, allowing it to conform to a variety of object geometries. When glued to a thermo-formable substrate, such as polyethylene sheet, it can be vacuum formed into a rigid 3D shape (FIGS. 4B-D). While Velostat is the example material, the conductive material can include one or more of a carbon-loaded silicone, a carbon-loaded polymeric foil, etc.

The touch-sensing device 100 can include an extrudable plastic, such as a static dissipating ABS filament. For example, the ABS filament can have a resistivity of approximately 45MΩ/sq. In some implementations, the filament can be printed onto a substrate (using standard ABS settings). While ABS is the most common material used for injection molding, these techniques are applicable to mass-production injection-molding and blow-molding techniques. Likewise, subtractive methods (e.g., milling) should are compatible.

Figure 6:
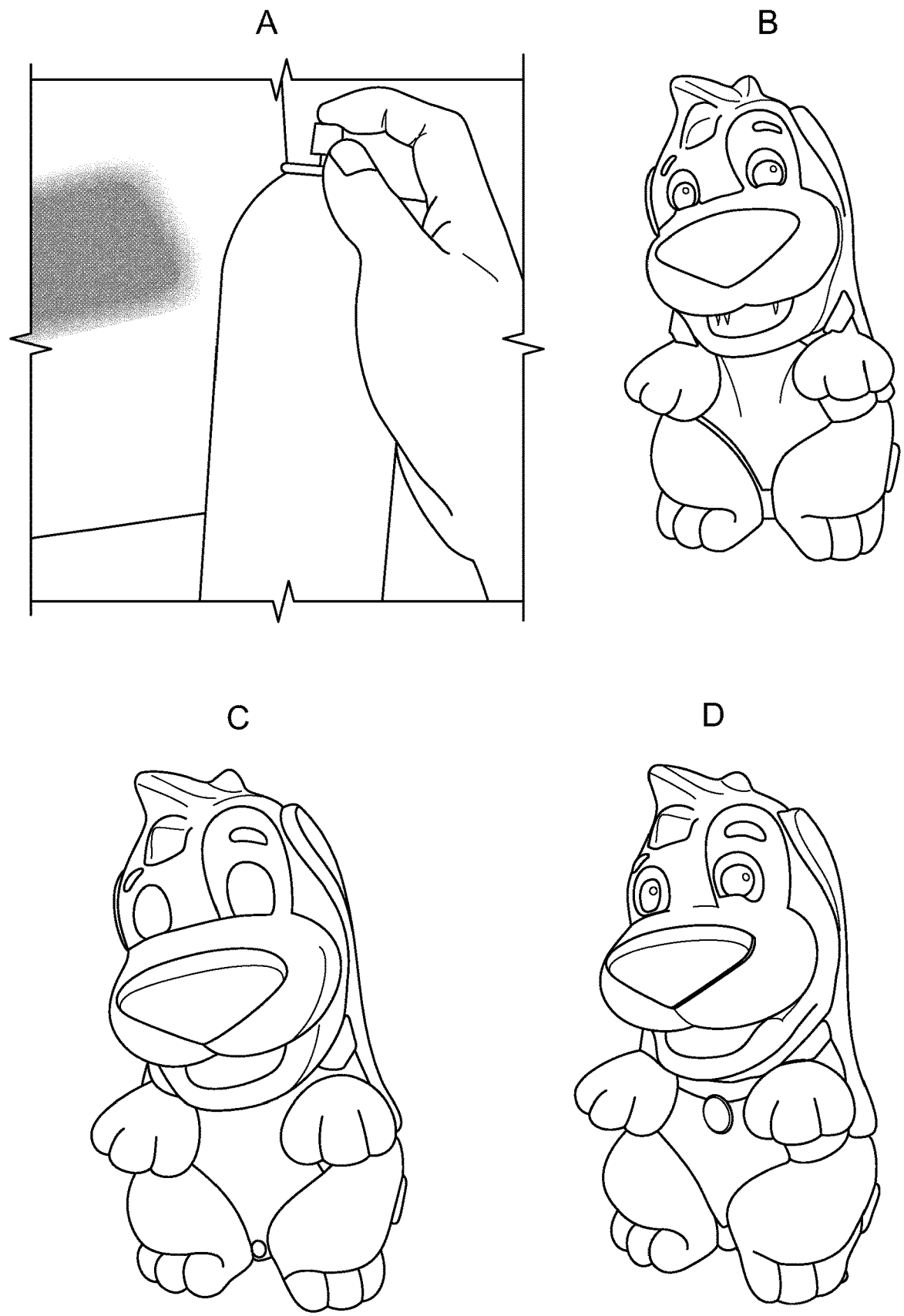
FIG. 6 shows an example of the touch sensing system using a carbon spray.

In some implementations, the conductive material can include a paint or spray coating. Paint and spray coatings are particularly versatile, as they can be added as a postproduction step to almost any object, whether small or large, flat or irregular, regardless of how the object was manufactured (e.g. vacuum forming, 3D printing, milling, injection molding, etc.). Total paint coverage of the objects was selected for maximum flexibility, but stenciling, silk-screening and other masking methods can also be used to define interactive areas. In some implementations, the conductive material includes a carbon conductive paint, as shown in FIG. 6., such as one designed for electrostatic discharge and RF shielding purposes. An evenly sprayed carbon coated surface has resistivity of 1 kΩ/sq, and dries to a durable, matte black finish.

The shunting effect of a user's finger occurs through capacitive coupling; direct ohmic contact is not required. This permits the use of an optional (thin) top-coat, which can be used to add color or a more durable finish to an object. Spray paint (e.g., as shown in FIGS. 15, 16, 19 and 21) and acrylic paint (e.g., as shown in FIG. 17) can be used. FIG. 6 shows a painted toy 600 as another example of application of the touch sensing system to an irregular geometry. A conductive coating is added (A) to add touch interactivity to an off-the-shelf toy (B, C), which was then repainted (D).

FIG. 5 shows an example implementation of a 3D printed substrate interfaced with the touch sensing system 100. A carbon-loaded ABS filament (A) was used to 3D-print a custom phone accessory (B, C) for a bongo game (D). When the user taps the 3D-printed bongos, the disturbance in the electrical field is detected (e.g., using electrodes in communication with a data processing device of the phone), and the touch is registered. In this example, the electrodes are placed on the bottom of the 3D printed substrate which includes the conductive material. In some implementations, the electrodes are placed around the touch pads of the bongos. Other similar 3D printed applications are possible.

Figure 25:
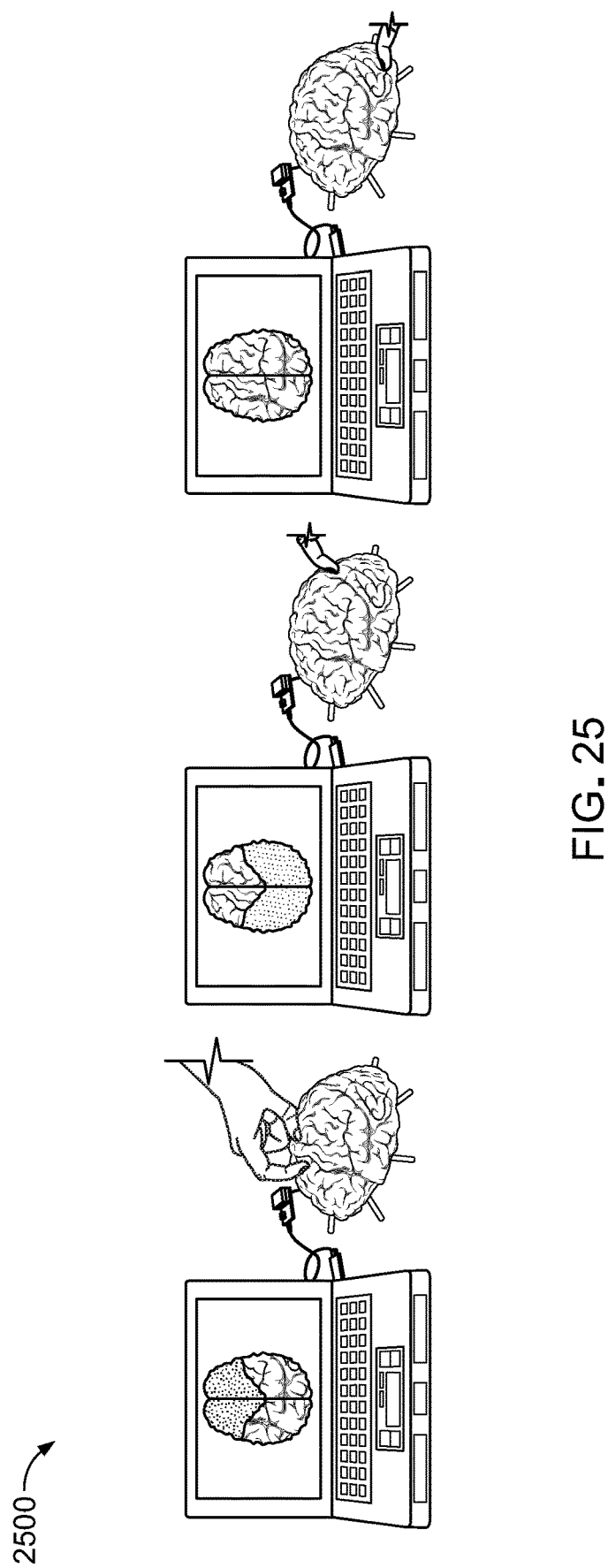
FIG. 25 shows an example of the system as applied to a molded object including a gelatin.

In some implementations, the conductive material is selected that is soft and pliable. For example, the conductive material can include a gelatin (e.g., Jell-O), which has a surface resistivity of roughly 12 kΩ/sq, as shown in images 2500 of FIG. 25, described in further detail below.

Figure 26:
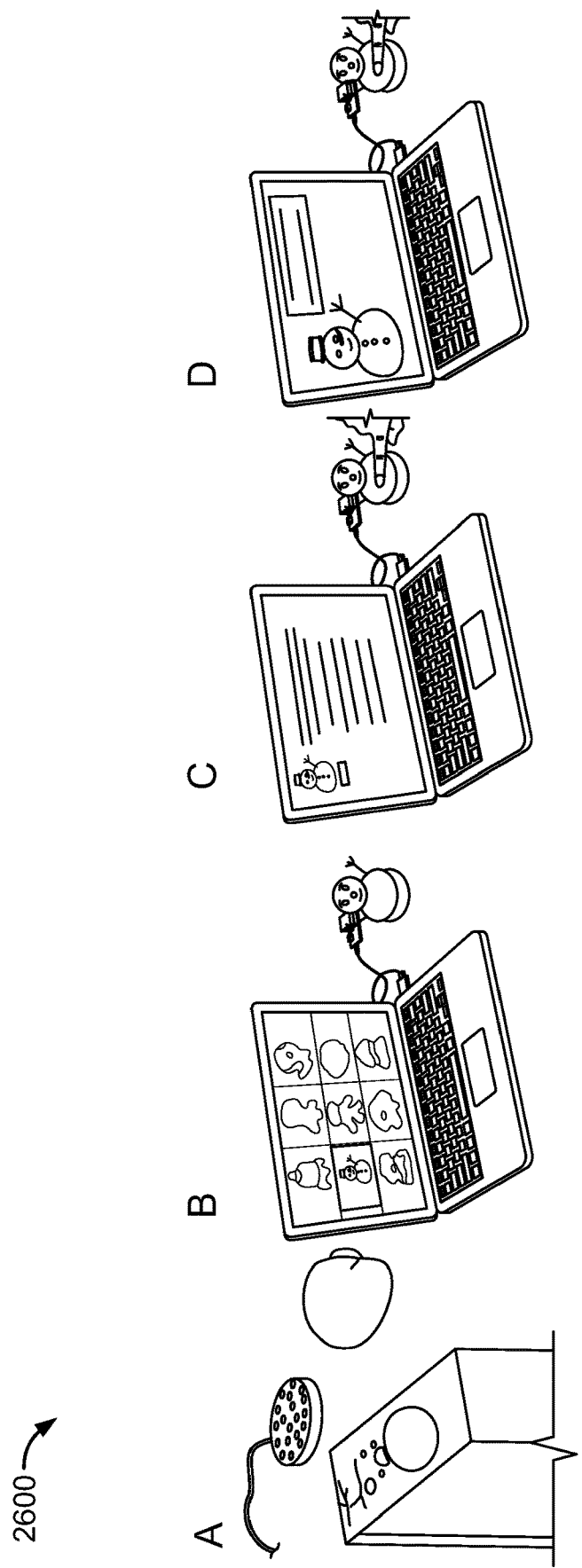
FIG. 26 shows an example of the system as applied to a molded object including a dough.

Moldable materials can also be used for the conductive material. For example, a dough material (e.g., Play-doh) can be made interactive using the touch sensing system. A user of a sculptable touch sensing system can sculpt a figure or object, and then bind interactive functionally to different touch locations. To achieve this, the sculpted object is placed onto an 8-electrode base, with small pins that penetrate the conductive material (e.g., the dough). Images 2600 of FIG. 26 show a snowman example, where different phrases are spoken by an associated device when a nose or belly of the sculpted snowman are touched by a user. In this example, the dough included a surface resistivity of roughly 23 k$\Omega$/sq. For such sculptable materials, users can shape objects and the objects can be made to be touch sensitive.

Figure 27:
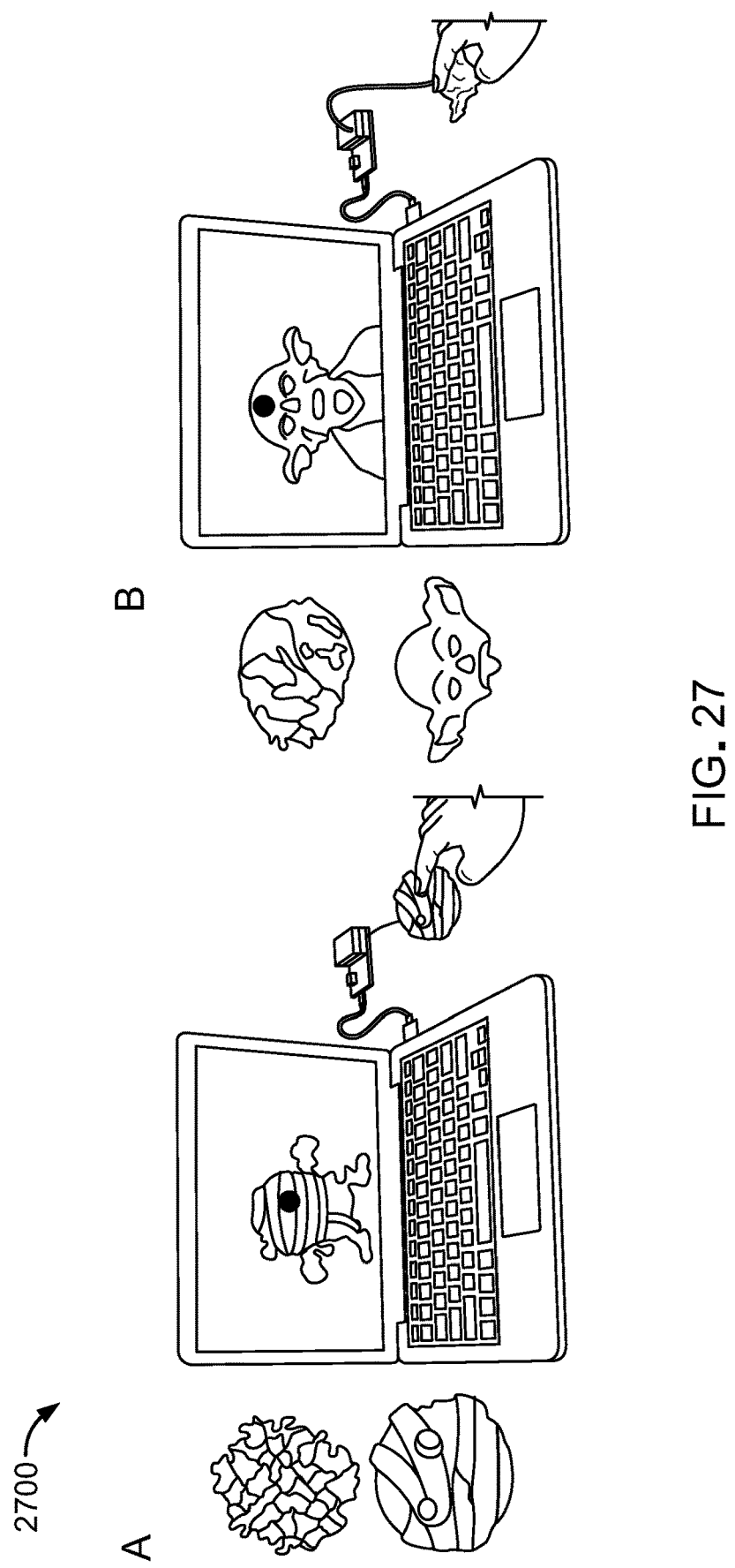
FIG. 27 shows an example of the system as applied to a molded objects including each of an ABS plastic or a carbon-loaded silicone.

Another pliable material is silicone, which is widely used in commercial molding/casting applications. For example, a conductive silicone can be obtained by mixing bulk carbon fiber with standard silicone (1:18 ratio by weight). The outcome has a surface resistivity of approximately 16 M$\Omega$/sq. From this material, a touch-enabled device can be made using the touch sensing system. For example, images 2700 of FIG. 27 show a squishable, interactive Yoda toy and a zombie toy constructed from conductive ABS. In this example, conductive ABS (A) and silicone (B) can be cast. Touching different areas of these toys triggers different sounds and effects.

The touch sensing system includes a hardware and a special signal-processing pipeline. Once a substrate (e.g., an object) has been created or coated with a compatible conductive material, the substrate is instrumented with electrodes, e.g., around the periphery of the intended interactive region. In one example embodiment, copper tape was used and connected to the data processing system 106. It is also possible to reverse these fabrication steps, attaching the electrodes first, and then covering over the electrodes with e.g., 3D printed material or paint.

Figure 7:
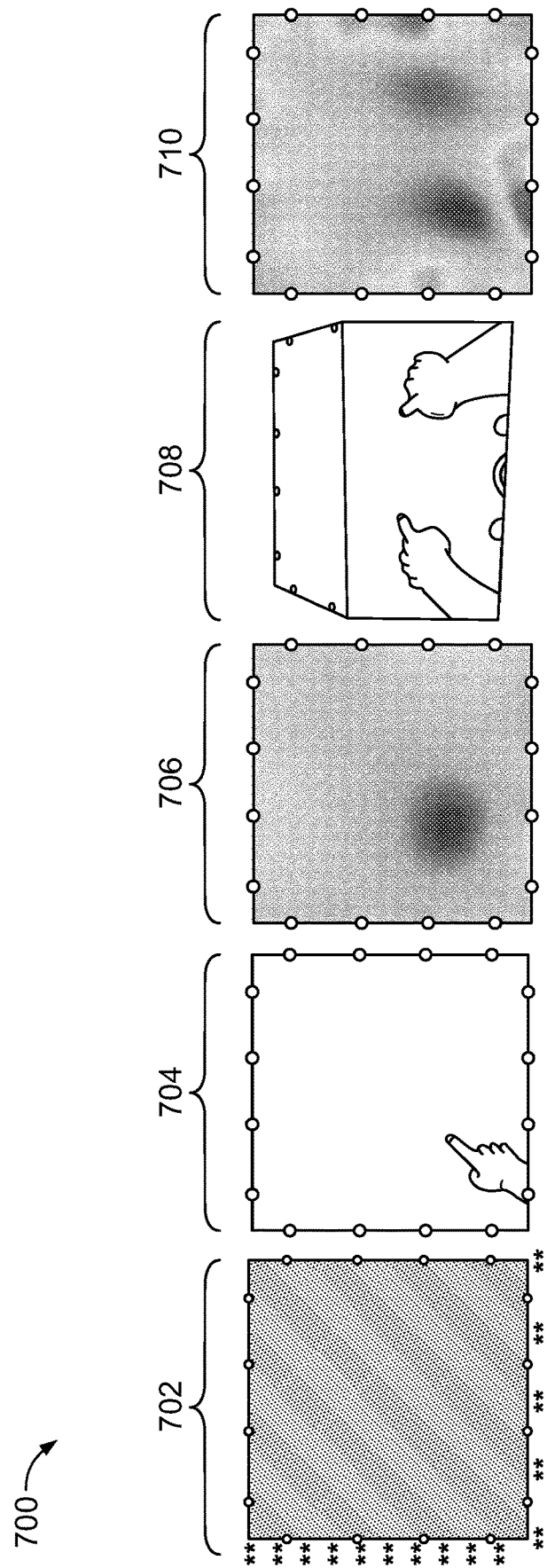
FIG. 7 shows a finite element model and reconstructed touch image.

The finger-tracking pipeline was initially developed using a fully realized tomographic reconstruction, to which standard computer vision "blob" tracking techniques were applied, as shown in images 700, 702, and 704 of FIG. 7. In one example, a single step Gauss-Newton method was used using a maximum a posteriori estimator to produce the tomographic reconstruction (provided by the EIDORS EIT toolkit).

The touch sensing system is capable of high accuracy and multi-touch segmentation, as shown in images 706 and 708 of FIG. 7. In some implementations, construction of a finite element model 700 (FEM) for each object before use can be used to calibrate the touch sensing system. This is relatively straightforward for circular or square planar surfaces. This method is sensitive to small manufacturing variances, such as electrode adhesion and coating thickness.

In some implementations, machine learning can be used for calibration as an alternative. Machine learning can offload much of this variability and complexity of the FEM. For example, rather than modeling an object's geometry, the touch sensing system 100 can perform a simple one-time calibration on the object itself, from which machine learning models can be initialized. In addition to permitting arbitrary geometries, this process also innately captures and accounts for variances in construction. For input features, the touch sensing system 100 uses raw cross-sectional measurements with no additional featurization, as this data intrinsically encodes spatial inputs. Thus the lengths of the feature sets can be found in Table 1 (the "number of measurements per frame" row).

Below are two example classification approaches. For sensing discrete touch positions (e.g., virtual buttons), the touch sensing system 100 uses a classification model (built using Weka, SMO, RBF kernel with $\gamma=0.07$). The same parameters are used for models that distinguish between touch and no-touch states, and that distinguish between different touch locations. To support continuous 2D touch tracking, the touch sensing system 100 uses two independent regression models (SMOReg, RBF kernel with $\gamma=0.01$) operating in parallel—one for X position and another for Y position.

The versatility of the touch sensing system 100 means that there are a wide range of combinations of the touch sensing system: different electrode counts (8, 16, 32), example materials (Velostat, carbon spray, carbon ABS), surface sizes (15×15, 30×30, 60×60 cm), surface geometries (flat, curved, angular), and coatings (bare, paper, spray paint).

FIG. 8 shows an example touch sensing system apparatus 800 which was used to capture the touch sensing system's performance and not user inaccuracies, a template was employed to guide user touches. This was a 15×15 cm laser-cut sheet of (non-conductive) acrylic with a 4×4 grid of 1.5 cm holes, as shown in FIG. 8. This was overlaid onto the experimental surface. For testing the touch sensing system, various parameters were selected for the testing apparatus. For factors within control, variables were selected with intermediate performances, e.g., all experiments used 16-electrode sensing (except for the electrode count experiment).

To ensure adequate space for electrodes, a 30×30 cm Velostat sheet augmented with 32 electrodes was used, as shown in FIG. 8. right. The data processing system 106 was configured for 8, 16 or 32 electrode modes in software.

Figure 10:
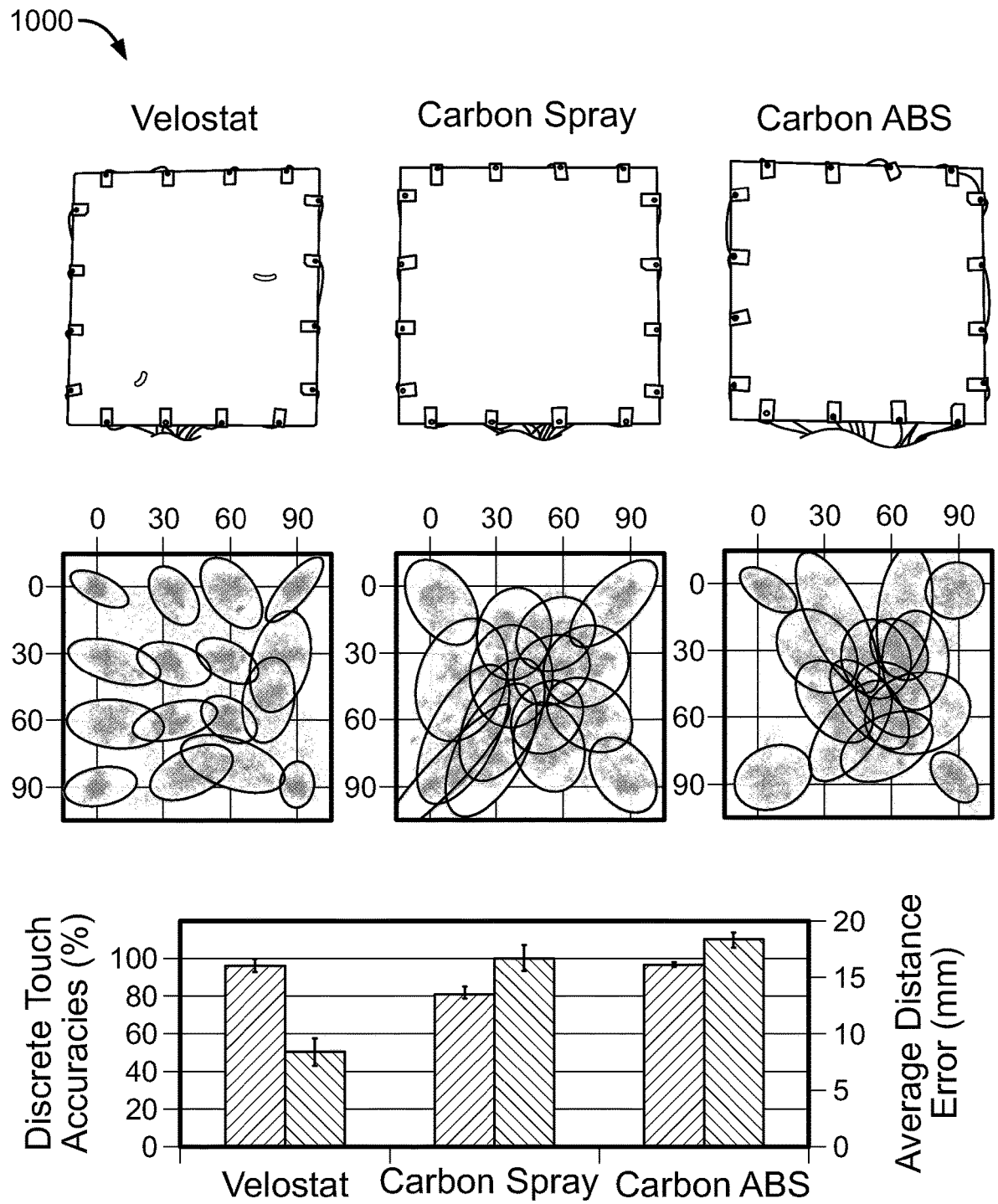
FIG. 10 shows testing panels and evaluation results for a material experiment.

Due to the limited bed size of the 3D printer, material conditions were 15×15 cm in size. The carbon spray and Velostat were applied to ⅛" thick acrylic sheets, while the carbon ABS was printed monolithically with 1 mm thickness, as shown in FIG. 10. All touch panels were flat with 16 electrodes attached.

Figure 11:
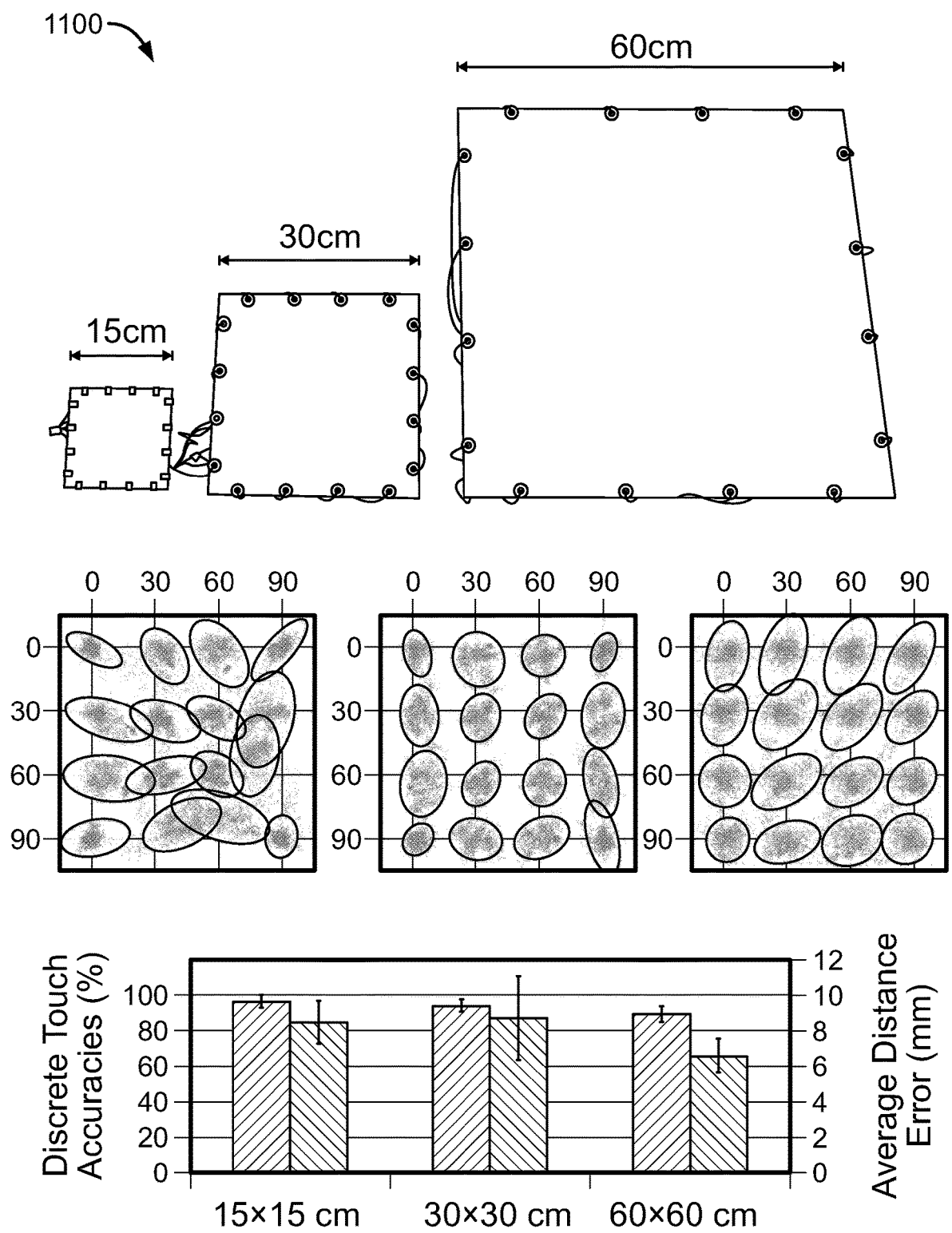
FIG. 11 shows testing panels and evaluation results for surface size experiment.

Three sizes were tested: 15×15, 30×30 and 60×60 cm, as shown in FIG. 11. These were all flat, Velostat-coated acrylic sheets augmented with 16 electrodes. The touch template location was randomized on the 30×30 and 60×60 cm touch panels per user.

Figure 12:
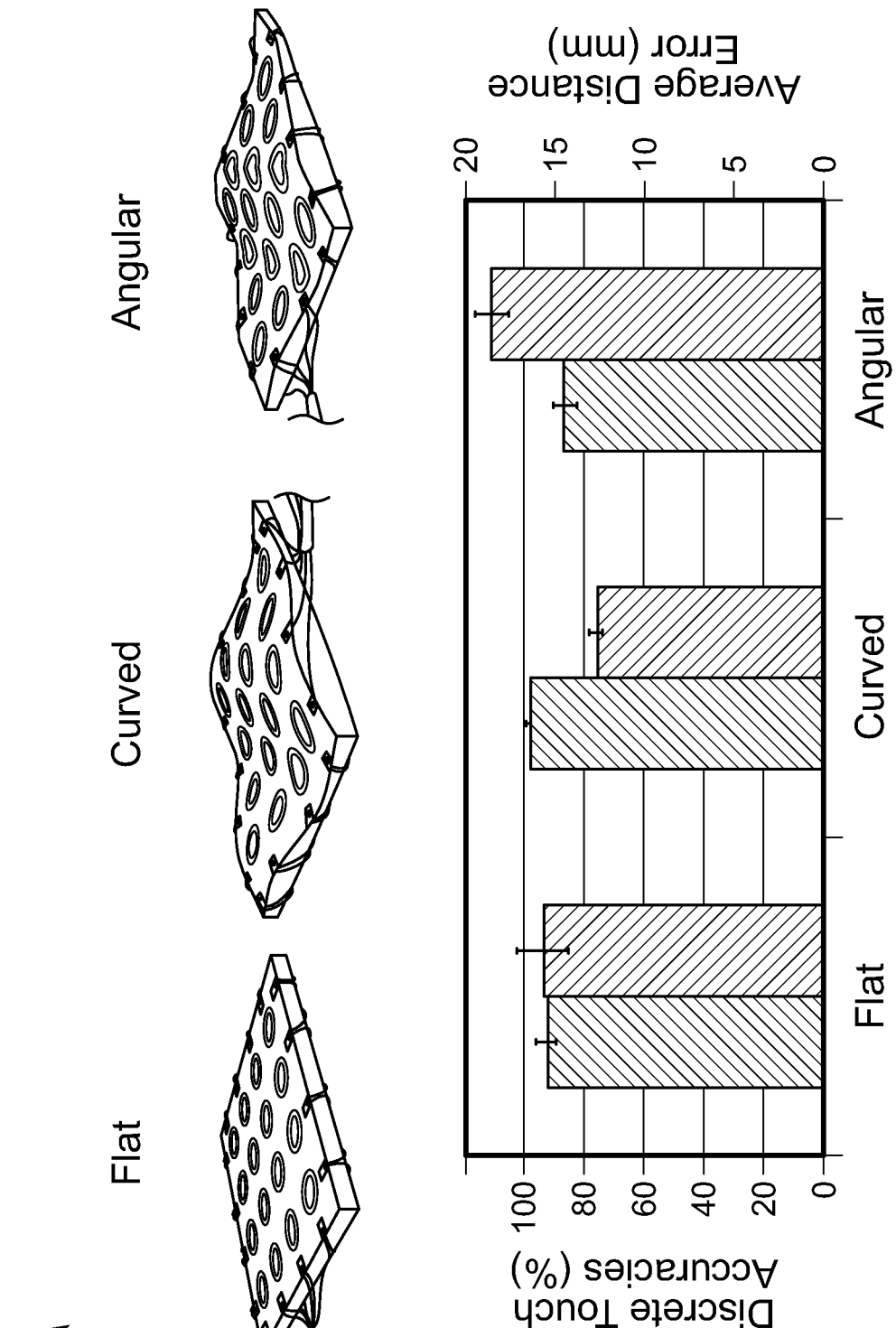
FIG. 12 shows testing panels and evaluation results for a geometry experiment.

In order to vary surface geometry, three 15×15 cm panels were 3D printed (using conventional filament): flat, curved, and angular, as shown in FIG. 12. To best conform to the irregular surfaces, carbon spray was used. Touch points were marked with painted white circles. All conditions used 16 electrodes.

The test conditions were bare (i.e., unmodified), paper-coated, and spray painted. These coatings were applied to a flat, carbon-sprayed, acrylic sheet 15×15 cm in size fitted with 16 electrodes.

The same procedure for all five experiments was used, the order of which was randomized. When first presented with a surface condition, participants were asked to hold their finger roughly 5 cm away from the surface. Over a period of roughly one second, 30 data points were recorded and labeled as "no touch".

Participants were then instructed to touch each of the 16 points denoted by the touch template. This was done one at a time, in a random order, as requested by a simple visualization on a laptop screen. Each time a user touched a point, 30 data points were recorded. The laptop emitted a beep when the user could proceed to the next point. This concluded one round of data collection.

This data was then used to train the two touch-sensing machine learning models. For discrete touch location sensing, all data was used to train a touch/no-touch classifier and a separate 16-class classifier having one class for each touch location. However, for the regression-based, continuous touch-tracking model, only data from the four corners was used. This mitigates overfitting and offers a more realistic evaluation of accuracy.

In some implementations, the classifier can be a part of a neural network of the touch sensing interface. The neural network receives data representing a baseline electric field of the conductive interface or other calibration values as weights for synapses of the neural network. The neural network applies the raw measurements of the electric field (e.g., voltage measurements from various electrode pairs) as features into the neural network. The neural network outputs data that includes a determination of whether one or more regions of the interface of the touch sensing system are being touched or not touched.

In some implementations, the classifier can include a support vector machine (SVM). The feature inputs to the SVM include raw measurements of the electric field taken by the pairs of voltage-measuring electrodes. The SVM outputs data including a determination of whether a region of the interface is being touched or not touched.

The touch sensing system's accuracy was then tested live (i.e., no post hoc calibration, algorithm tweaks, data cleaning, etc.). Following the same procedure as above, where users moved sequentially through all touch points in a random order. This time, the system's live classification result was recorded along with the requested touch location for later classification-accuracy analysis. In the case of continuous touch tracking, real world coordinates were recorded (e.g., requested X, Y: 30.0,60.0 mm; sensed X, Y: 31.2,59.4 mm). These coordinates were later used to compute the Euclidean-distance error.

This testing procedure was repeated twice more, for three rounds in total. This four-round, training-then-test procedure was repeated for every condition in all five experiments. In total, the study took around 70 minutes.

Results are presented, as well as a post hoc study investigating sensing stability across users. All results figures use standard error for their error bars.

Touch/no-touch classification accuracy averaged 99.5% (SD=0.5) across all conditions and factors. The one significant outlier ($p<0.05$) from this average was the paper coated condition, which had a touch segmentation accuracy of 93.2%.

Figure 9:
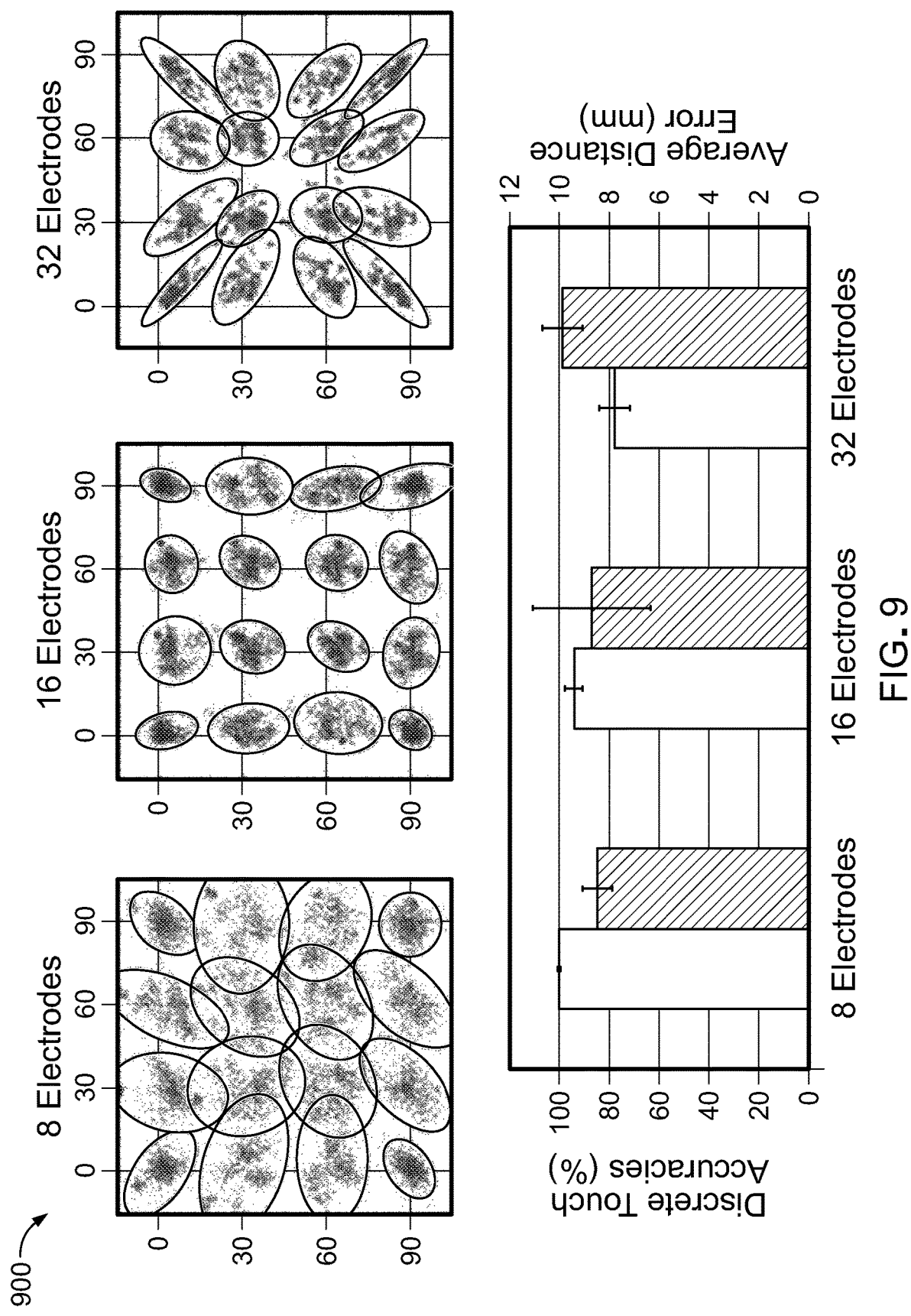
FIG. 9 shows evaluation results for an electrode count experiment.

The touch tracking accuracy across the three electrode count conditions is shown in data 900 of FIG. 9. The discrete touch location classifier achieved 90.7% (SD=12.0%) accuracy, while the continuous tracking had a mean distance error of 9.1 mm (SD=4.7). A two-tailed paired t-test showed that the 32-electrode condition was significantly worse than 8 electrodes ($p<0.05$) in the case of discrete tracking. As an additionally visualization, plot touch trials from all participants are plotted, along with $2\sigma$ ellipses drawn to scale.

The reduction in accuracy was chiefly due to the reduced distance between emitting electrode pairs. A shorter electrode separation means that the electric field does not project as far out into the conductive medium, which reduces the signal-to-noise ratio (SNR). Furthermore, the reduced distance between sensing pair electrodes similarly decreases terminal resistance, resulting in smaller voltage measurements, again reducing SNR. This result suggests that electrode count should be tuned according to surface size; e.g., for smaller interactive areas, lower electrode counts are likely to work better.

The material results, seen in data 10000 of FIG. 10, show an average discrete touch accuracy of 91.4% (SD=9.6) and mean distance error of 14.4 mm (SD=3.8). For continuous tracking, a paired t-test shows a significant difference between Velostat and the other two materials ($p<0.05$). This is likely to be a result of Velostat's superior homogeneity (compared to the other two conditions), as it is an industrially manufactured material. This makes the electric field projection more linear. Small non-linearities in the carbon spray and carbon ABS conditions meant that the tracking regressions could not accurately interpolate interior touches. Positional accuracy improves towards the corners. This suggests that a denser calibration pattern (as opposed to a sparse, four-corner one) could overcome such material variances.

FIG. 11 shows the results of the surface size experiment. The average classification accuracy for discrete touch locations was 93.0% (SD=14.3) and the mean continuous finger tracking distance error was 7.9 mm (SD=5.6). Larger surfaces tend to have more linear regression results, though there is no significant difference between the three conditions. This is probably not directly related to size per se, but rather ties into the earlier observation about electrode separation (i.e., as surface size increases, so does electrodes electrode separation, improving accuracy).

The accuracy of the three surface geometry test conditions is shown in the data 1200 of FIG. 12, which indicates an average discrete touch accuracy of 92.9% (SD=9.8) and continuous touch tracking distance error is 15.7 mm (SD=3.5). There is no significant difference between conditions.

Figure 13:
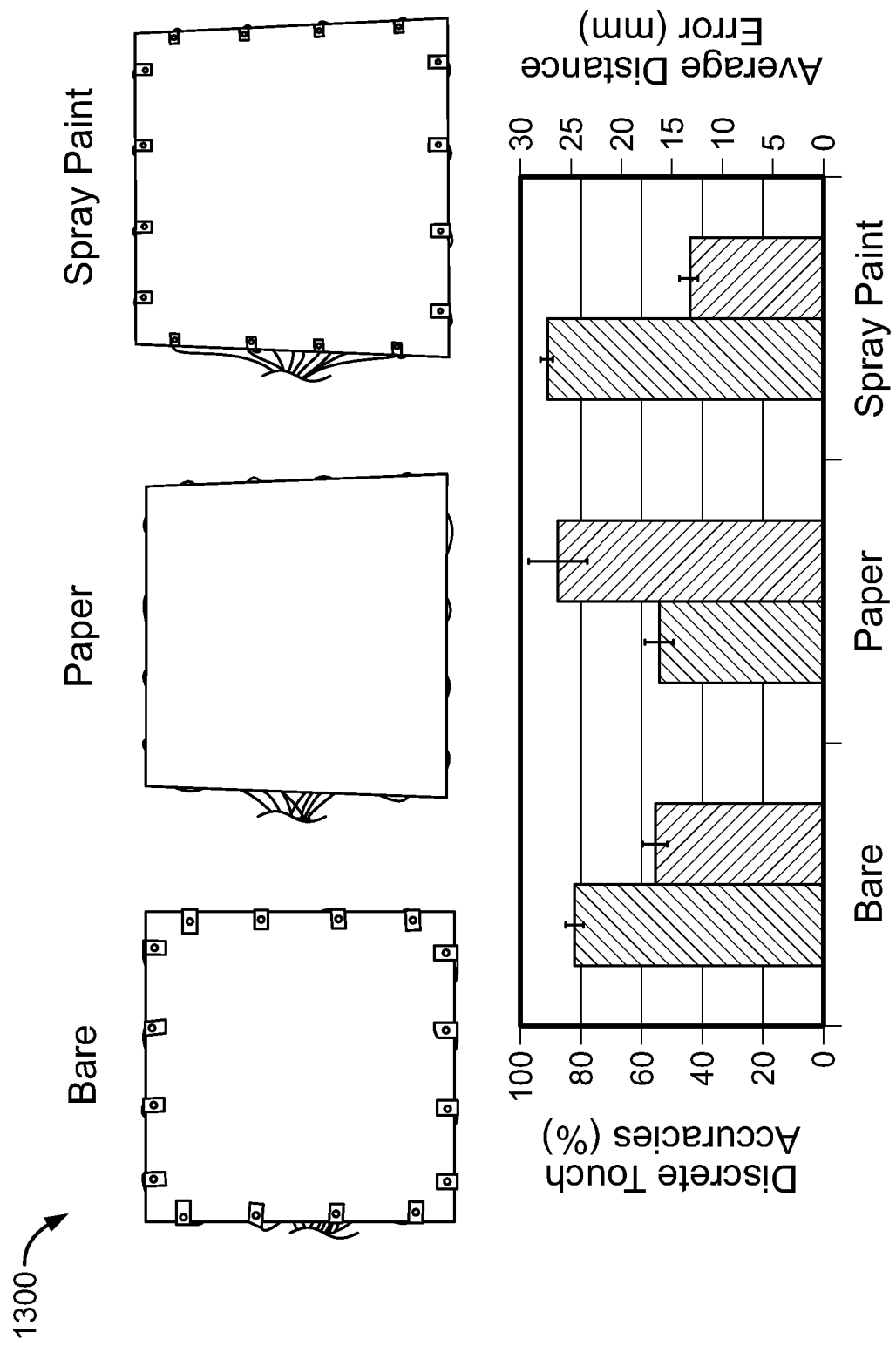
FIG. 13 shows testing panels and evaluation results for coating experiment.

FIG. 13 shows the results 1300 from the coating experiment. Spray painting and bare performed equally well, suggesting some coatings are immediately compatible with the touch sensing system, opening a range of finish and color options. However, the paper covering resulted in significantly worse performance ($p<0.05$) than both other methods.

Figure 14:
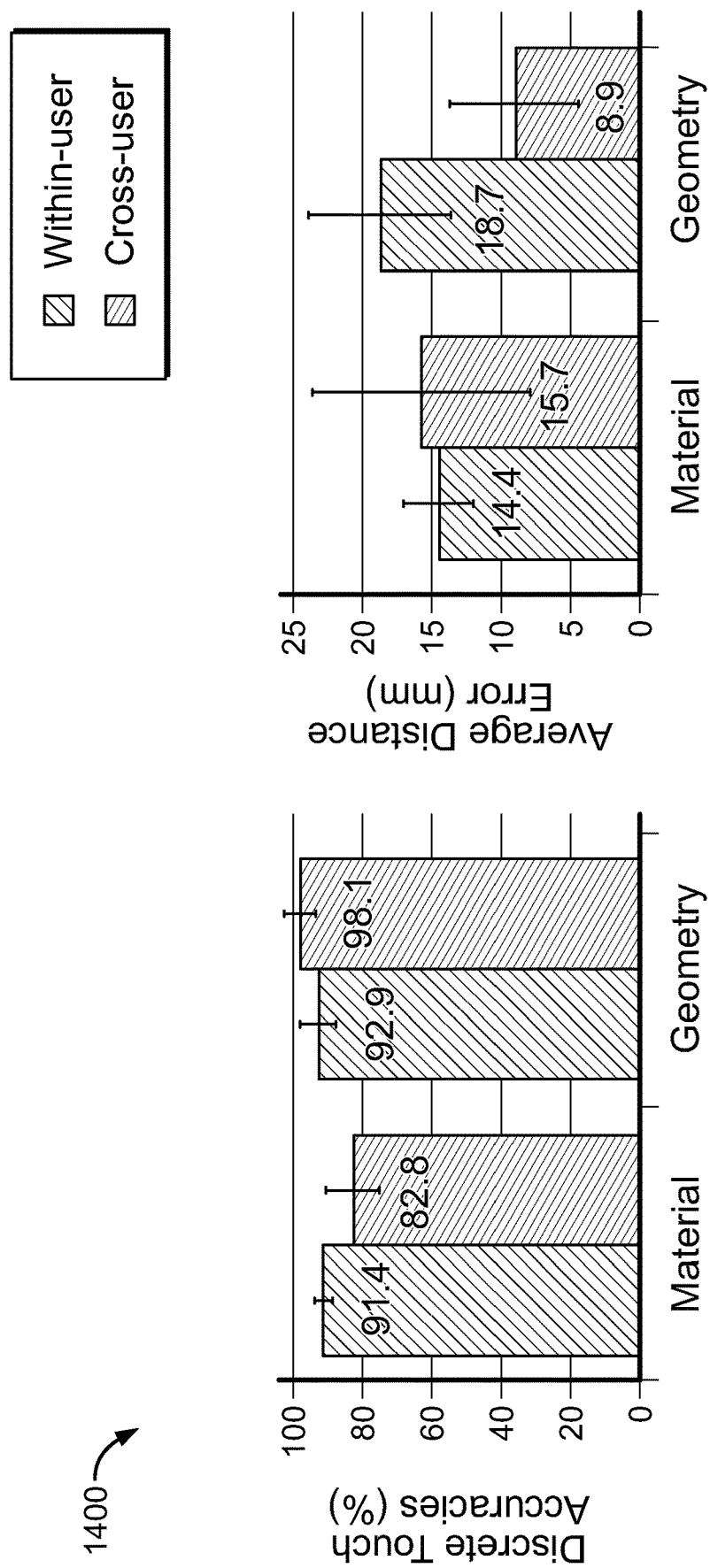
FIG. 14 shows evaluation results within-user accuracies and cross-user accuracies for the material and geometry experiments.

A train-test experimental procedure was employed in the main evaluation in order to test the system live, which offers an honest appraisal of real world accuracy. To explore whether the system sensing was user-dependent, or if the touch sensing was universal across users, a leave-one-user-out crossfold validation experiment was run. In each fold, the system was allowed to train on 13 users' data, and then tested on a data from the 14th user. This was repeated for all user combinations. This effectively simulates "walk up" accuracy, wherein the system has never previously seen the user. The post hoc test for material and geometry studies; results 1400 are shown in FIG. 14. Overall, discrete touch location classification accuracy decreases by a mean of 3.3%, while continuous touch tracking improves by 2.5 mm. These modest fluctuations, neither of which is statistically significant, suggest that the system can be trained (e.g., factory calibrated) on a small subset of users and then work for all.

The expressivity of the system is demonstrated with a variety of examples in this section. The examples include the system in use with large surfaces, irregular geometries, and rapidly prototyped objects.

Figure 15:
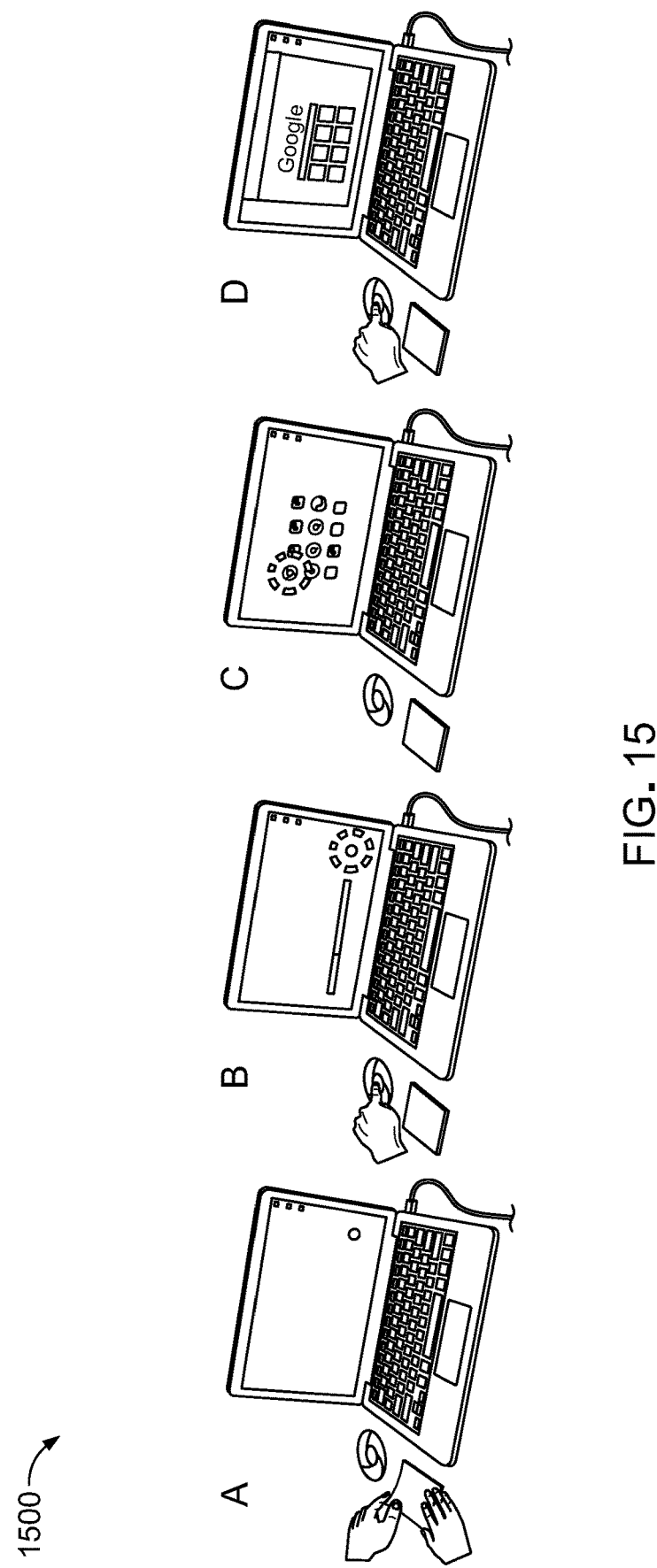
FIG. 15 shows an example application using a desk.

A desk was carbon sprayed and then attached sixteen electrodes on the sides of the desktop, as shown in images 1500 of FIG. 15, and the desktop was also coated with a white finish color. In this example, a user can register an app to a physical sticker anywhere on the table. After the sticker is registered, the user can click it to quick launch the app. For example, the desk was carbon painted and eight electrodes were affixed to the sides of the desktop, allowing the whole surface to become touch sensitive. As an example application, users can place paper stickers anywhere on the table, register them to an application (e.g., browser) or function (e.g., mute), after which the stickers can be pressed to quick launch items.

Figure 16:
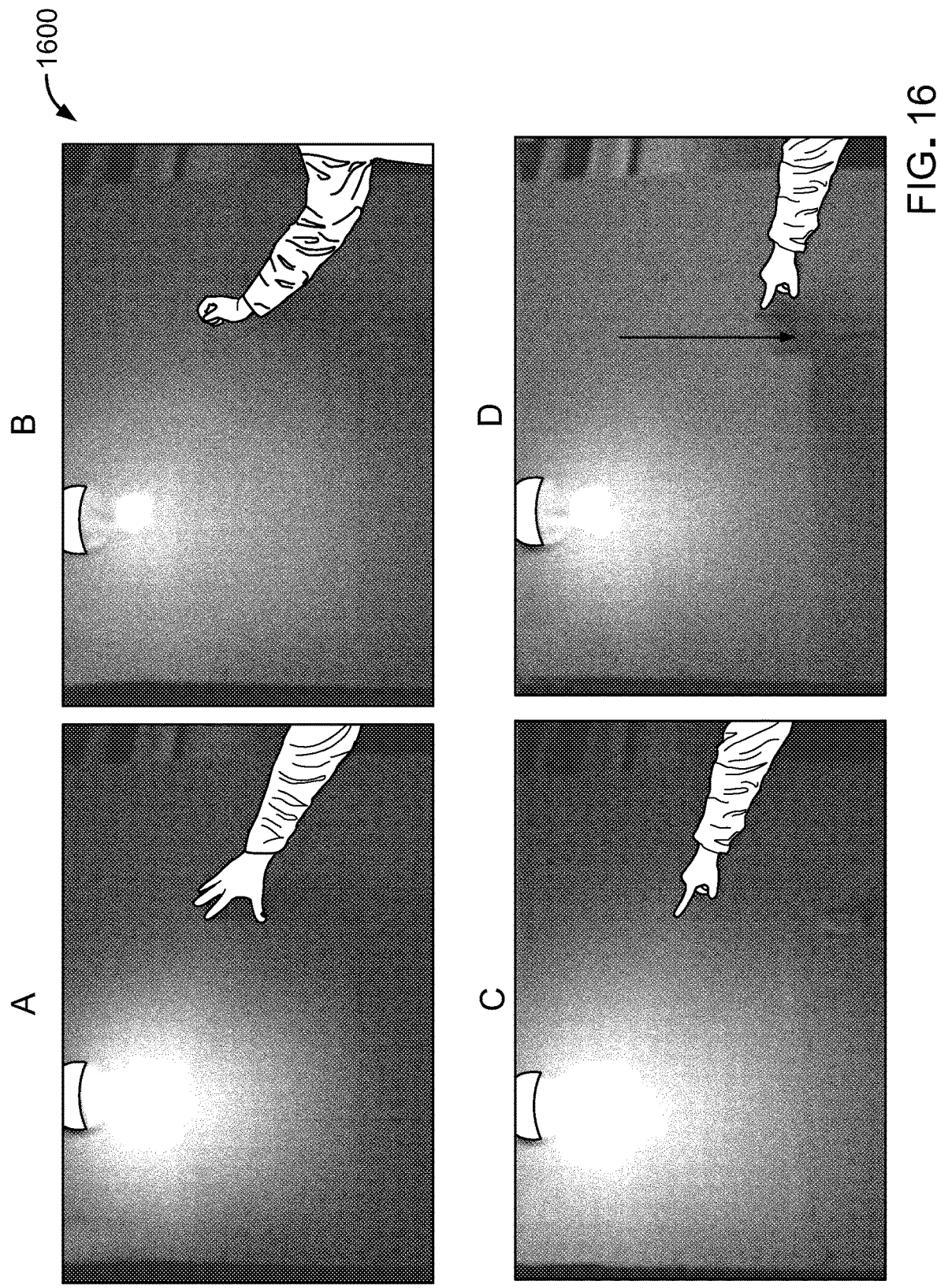
FIG. 16 shows an example application using a wall.
Figure 17:
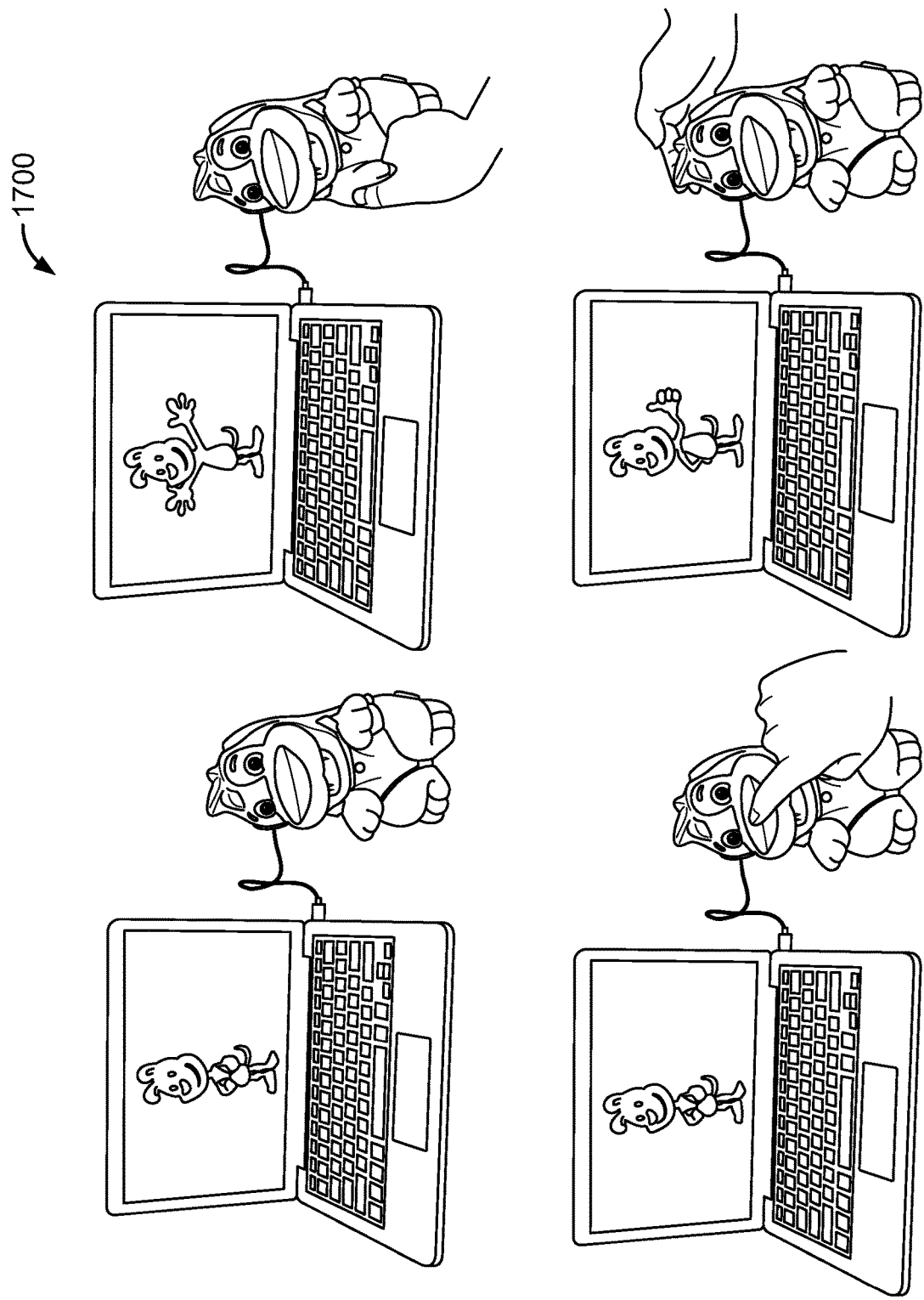
FIG. 17 shows an example use of the system transforming a toy into an interactive toy.

A 4×8-foot piece of dry wall was used with the touch sensing system 100, as shown in images 1600 of FIG. 16. For example, using 16 electrodes, a 107" diagonal touch surface was created on the wall. An off-white latex wall paint was applied atop the conductive material. Pervasive touch-sensitive walls enable innumerable applications. For example, the touch sensing system can include a light control application. In this example, tapping the wall anywhere near a source light toggles the light on/off, and dragging up or down allows the user to control the brightness.

Toys can easily be made interactive. A toy dog was carbon sprayed and brush painted with different colors, as shown in images 1700 of FIG. 17. The touch sensing system-enabled toy can then detect different touch locations for interactive applications.

Figure 18:
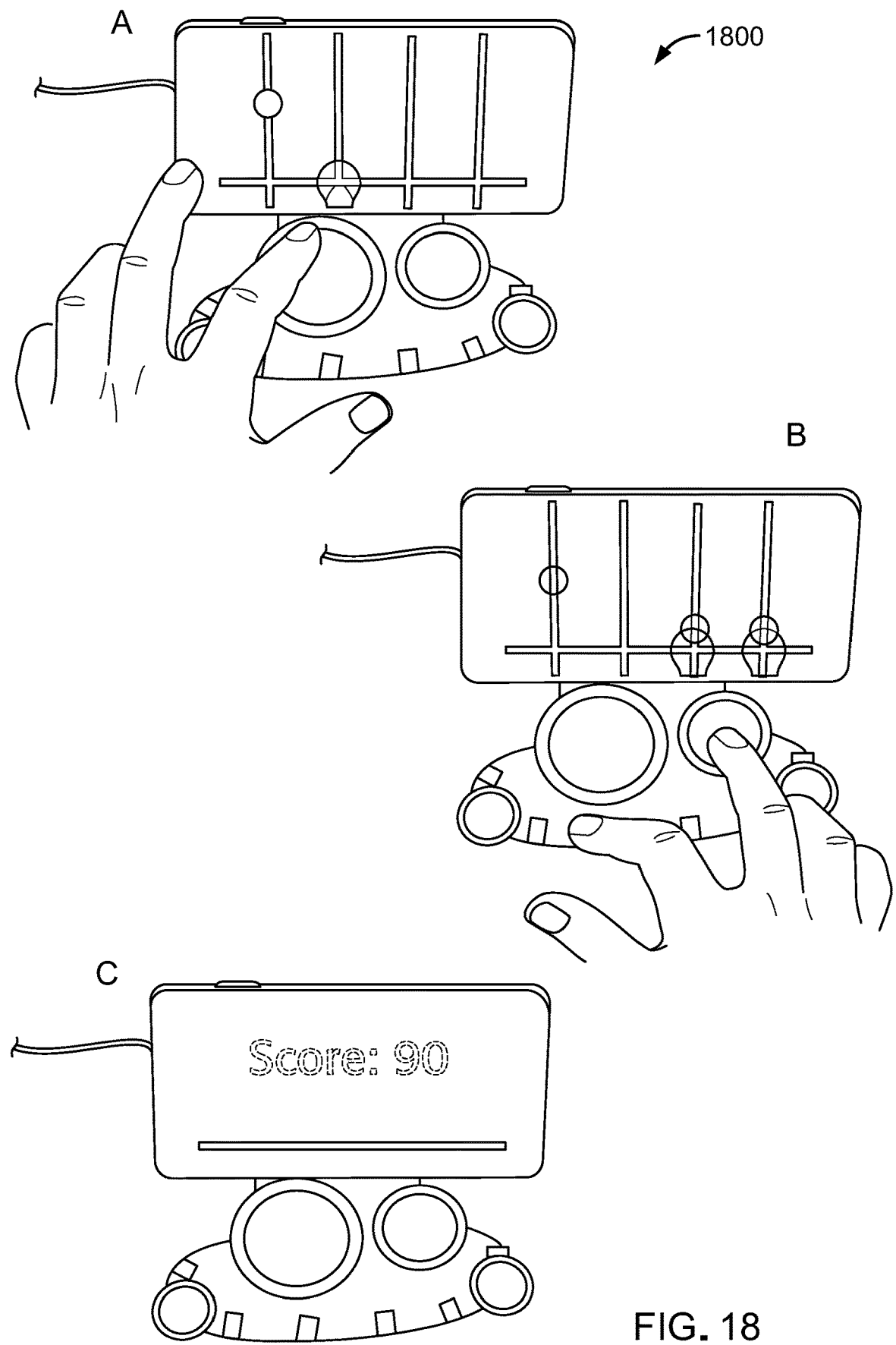
FIG. 18 shows an example use of the system enhancing a game via its use in a 3D-printed holder.

With the touch sensing system, 3D prints can be touch-sensitive. In this example, a user prints a bongo game with a phone holder with using carbon ABS, as shown in images 1800 of FIG. 18. The user then enables touch sensing by attaching eight electrodes to the periphery. This previously static print then becomes interactive and allows a user play a bongo game on the phone.

Figure 19:
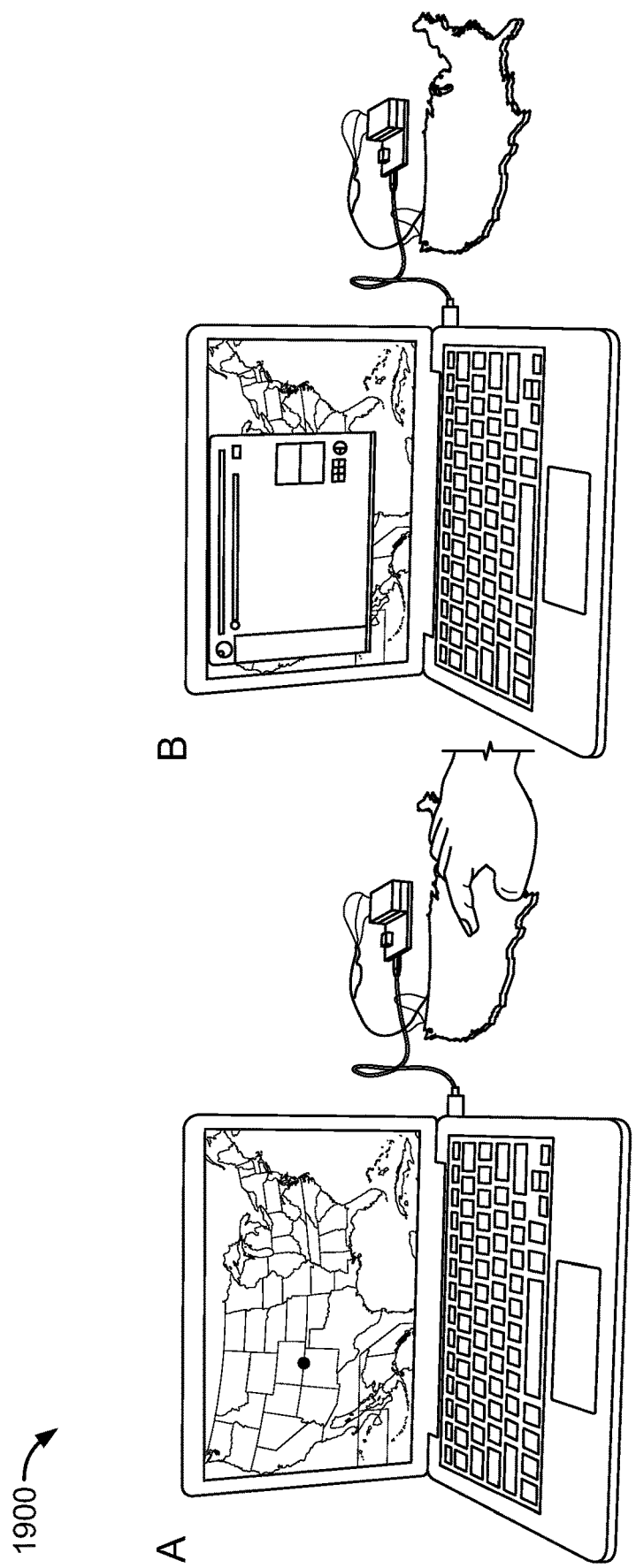
FIG. 19 shows another example use of the system applied to irregular surfaces: a 3D-printed map.

In some implementations, a US topographical map was 3D printed, coated with carbon spray, and finished with a green spray paint, as shown in images 1900 of FIG. 19. Information is retrieved based on the touch location.

Figure 20:
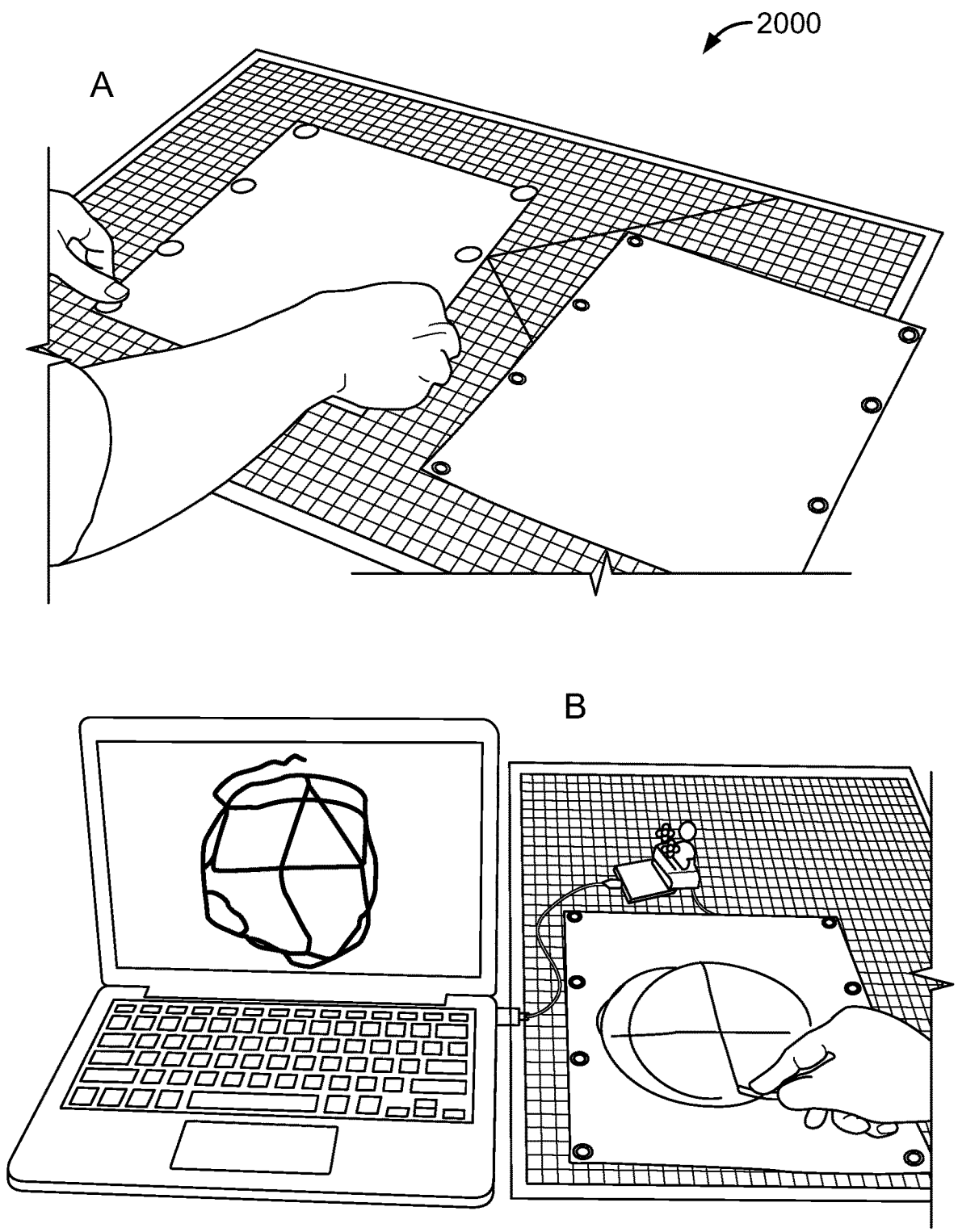
FIG. 20 shows an example use of the system with flexible surfaces.
Figure 21:
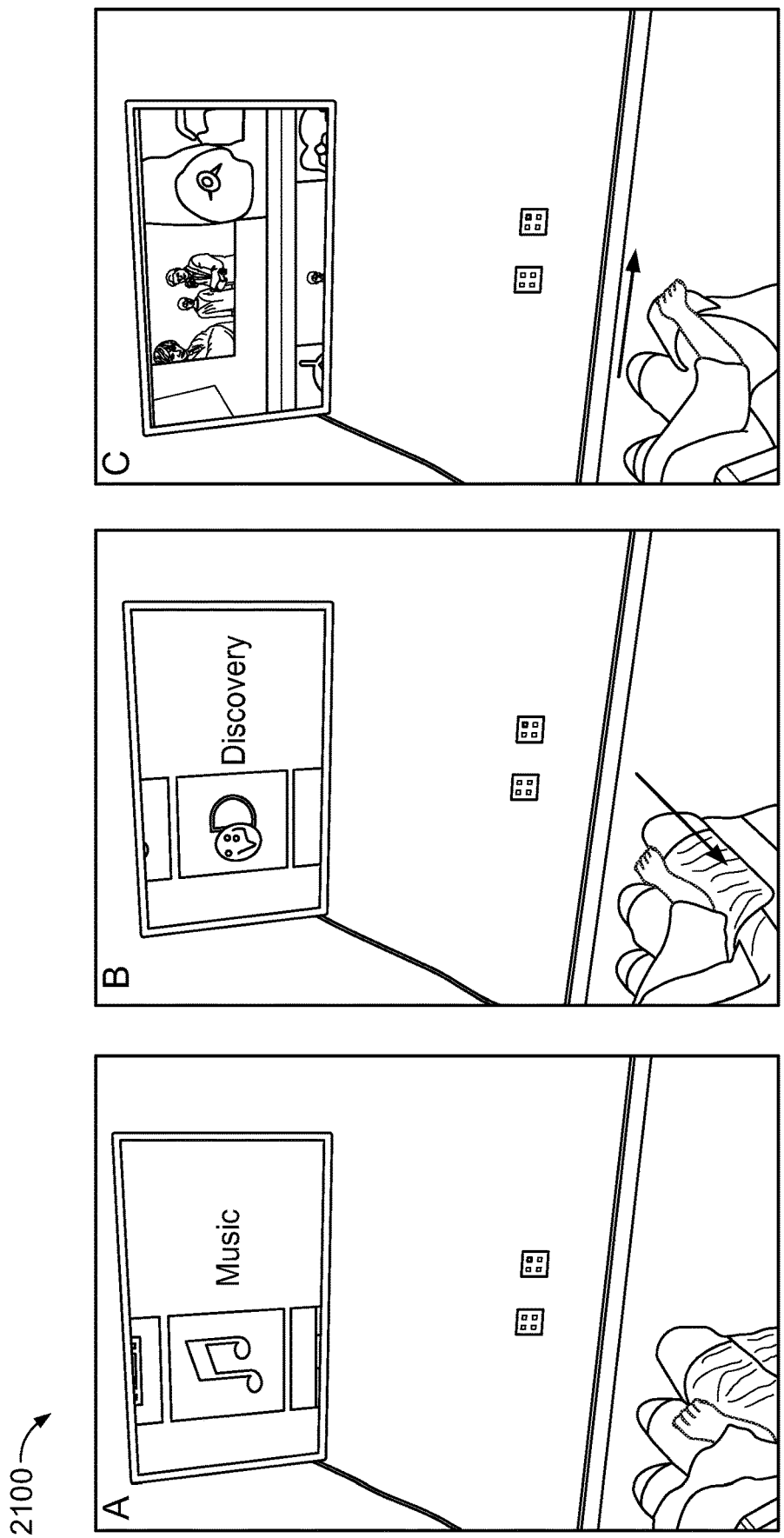
FIG. 21 shows example use of the system as applied to a sofa.

The touch sensing system 100 is compatible with flexible surfaces such as a fabric and paper. For example, a Velostat backing can be laminated to a piece of paper, as shown in images 2000 of FIG. 20. The paper can be placed on the conductive material. The magnets on the top of the paper ensure a good contact between the Velostat and the electrodes underneath. When a user draws with a charcoal stick, the drawing is tracked by the system and automatically saved. Because the interactive paper is very low cost, a user can simply throw it away after use.

In some implementations, the touch sensing system is combined to a system-enabled sofa. In this example, a user can swipe up and down to browse a list of apps, then confirm by a right swipe, as shown in images 2100 of FIG. 21.

Figure 22:
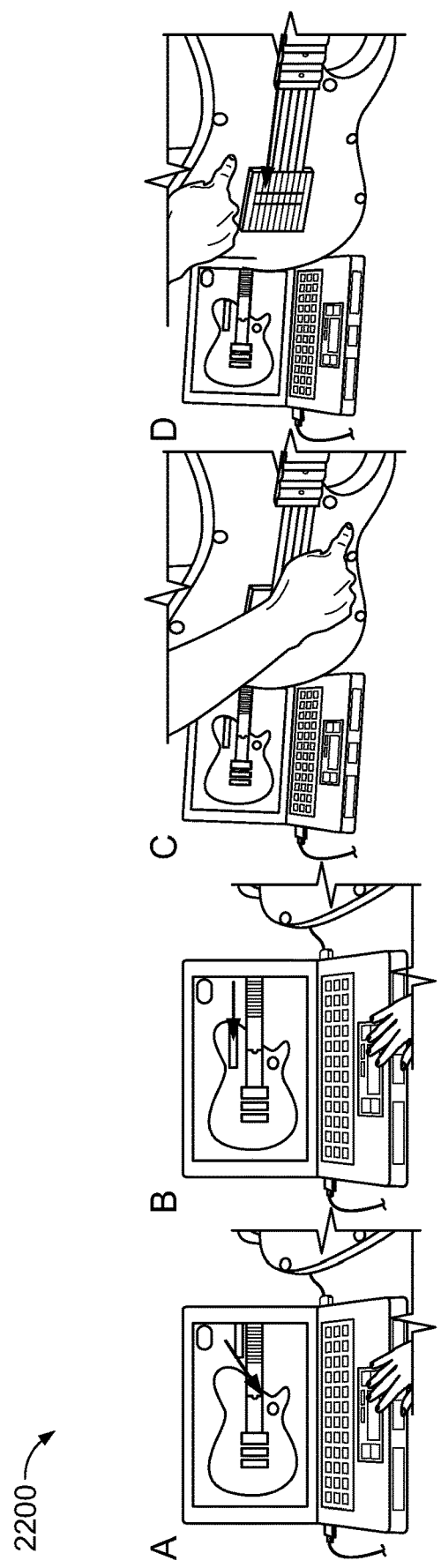
FIG. 22 shows an example of a guitar with dynamically configurable controls.

Rapid prototyping of touch-sensitive devices can be achieved with the methods of the touch sensing system 100. For example, a user can customize the locations of controls (e.g. filter, volume, etc.) by dropping them on a virtual guitar, as shown in images 2200 of FIG. 22. The guitar can then be used as if the controls are physically on that location with the system-enabled surface coating.

Figure 23:
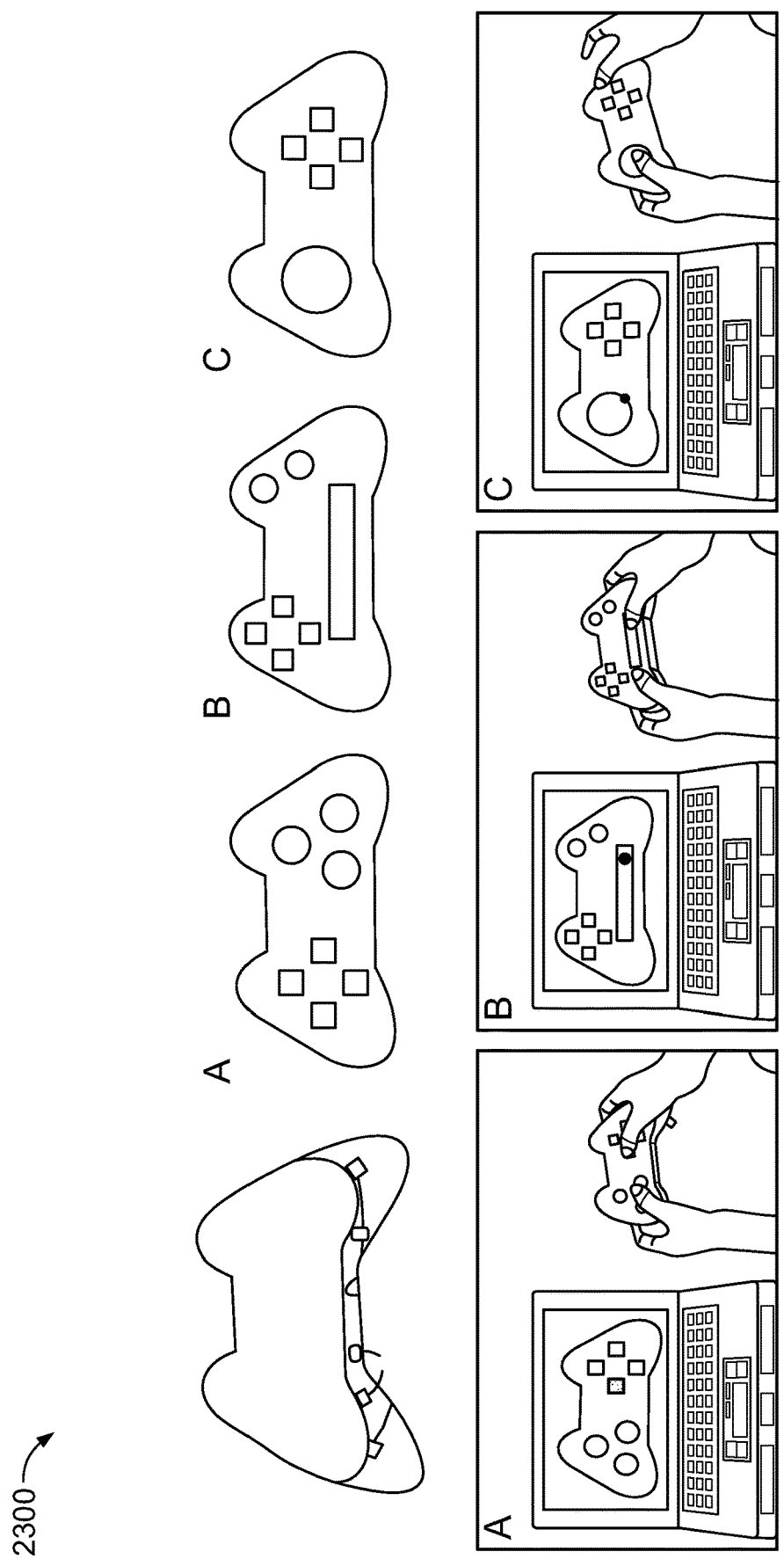
FIG. 23 shows an example of the system-enabled game controller.

Once the surface becomes touch sensitive, a user can configure the interface layout with templates to prototype different interactions. In this example, a user prints out a game controller with a system-enabled top surface. For example, the user designed three different templates featuring different interaction modalities, as shown in images 2300 of FIG. 23.

Figure 24:
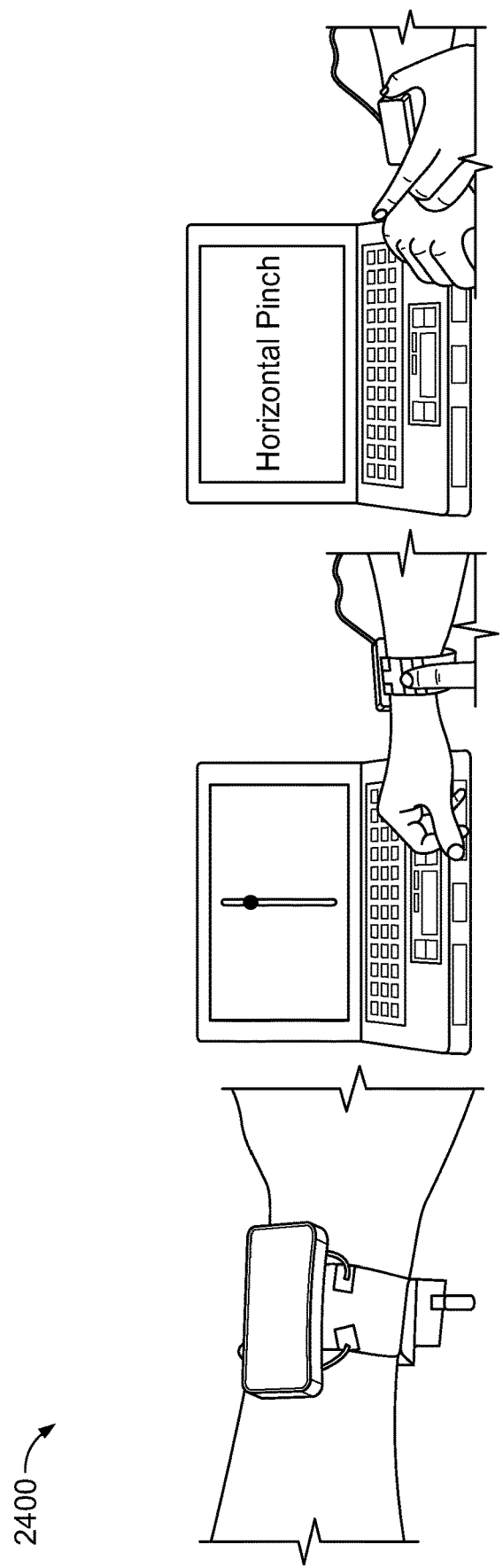
FIG. 24 shows an example of the system as applied to a touch sensitive prototype wearable.

In some implementations, a user can vacuum-form an object. The user can rapidly prototype not only the shape but also interactivities of the object. For example, a user makes a touch-sensitive wristband, which can detect 1D sliding and hand gestures, as shown in images 2400 of FIG. 24.

Figure 28:
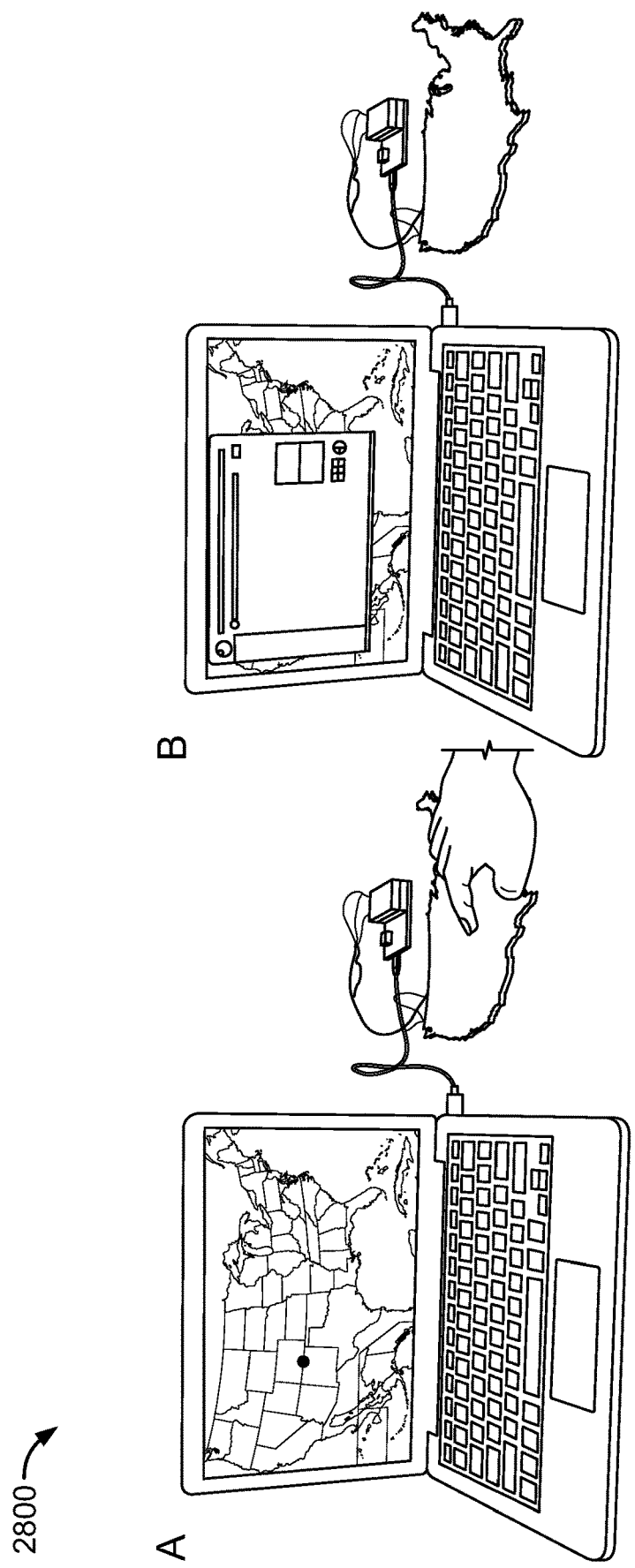

Physical props are often useful in learning visual-spatial subject matter. As an example, a model of a brain using gelatin can be created to simulate an organic feel. The model is placed onto an 8-electrode acrylic base. A user touches different regions of the model brain to summon information, as shown in images 2500 of FIG. 25. Such a base could be reused for any number of low-cost instructional objects. For example, a topographical map was coated with carbon spray, instrumented with eight electrodes, and covered by a green topcoat with spray paint, as shown in images 2800 of FIG. 28. For this application, information about different geographical regions is retrieved upon a user's touch.

Figure 29:
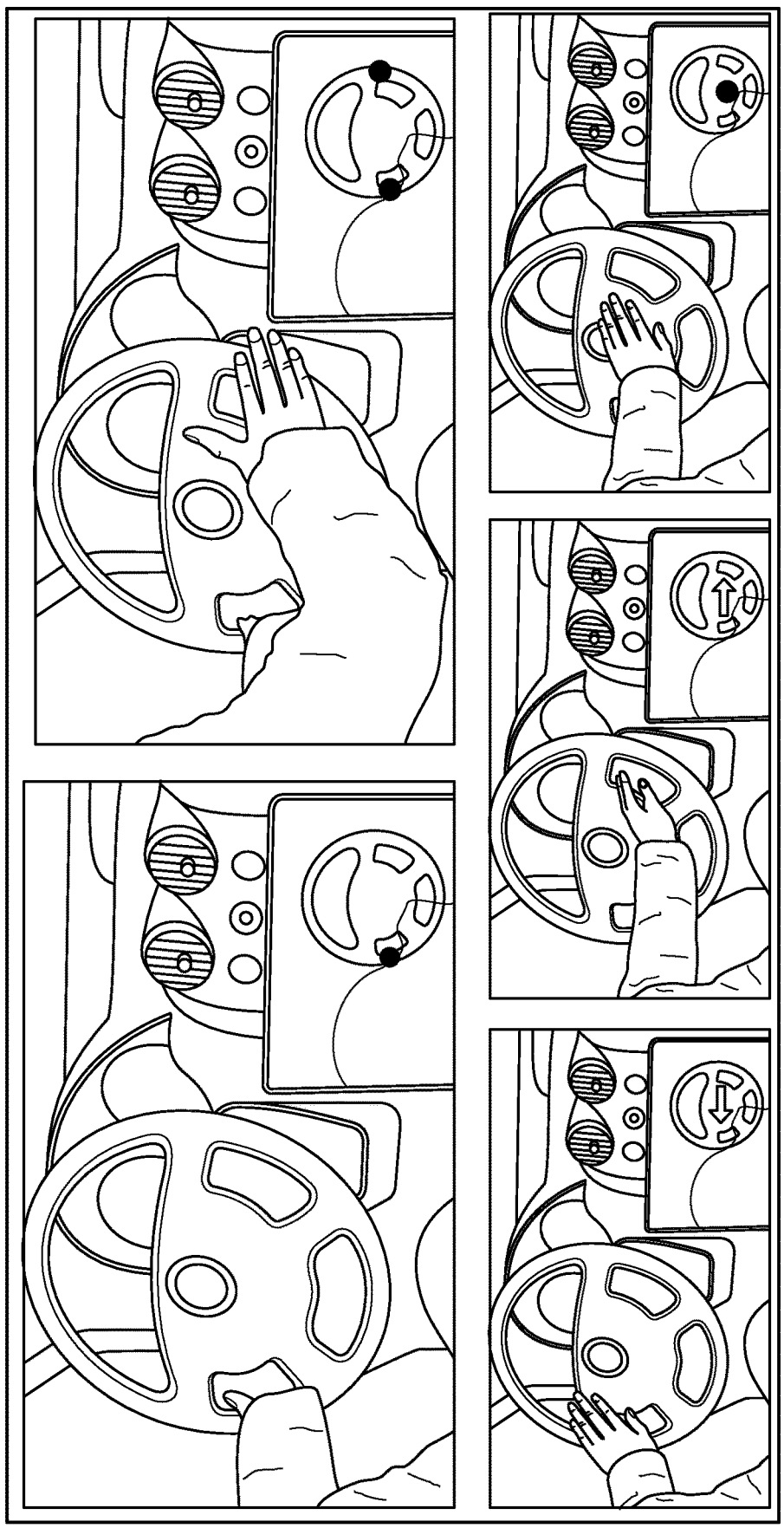

In one example, a phone case can be made touch-enabled using the touch-sensitive system. A phone case was vacuum-formed that included a rear cover for a Moto E smartphone, as seen in images 2900 of FIG. 29. When touch-enabled using the touch sensing system, such a phone enclosure provides protection and also can be used to detect various grips. Such input can be used for various purposes, such as to quickly launch applications or hardware, such as a camera or messaging application.

In one example, the touch sensing system can be applied to a steering wheel to enable the steering wheel to be touch sensitive, as shown in images 3000 of FIG. 30. In this example, the steering wheel represents a large, irregular object that has yet to be instrumented with rich touch functionality, despite offering an immediately useful surface for user input. For example, in one case, 8 electrodes were added to a carbon-sprayed Chevy Aveo steering wheel. The touch sensing system tracks the position of both hands of a driver, as well as detecting gestures, such as swipes.

The evaluations were focused on single-touch accuracy. In explorations of this technique, it was found that tracking multiple touch points was possible with reconstruction-based tracking. For example, when a user touches one finger from each hand on the touch panel, two blue blobs on the tomographic reconstruction are visible, as shown in image 708 of FIG. 7.

Environmental noise such as fluorescent light and RF radio is another concern. Due to the high resistance of the conductive layer materials, the conductive materials do not pick up airborne noise. However, the human body is a good antenna for many types of environmental electromagnetic noise. Among all noises found in a typical office setting, such as power-line noise, radio emissions, electromagnetic interference (EMI) from appliances, etc., only the noise from fluorescent lights (50 kHz and higher harmonics) affects the touch sensing system's measured signals. Interference usually occurs when the light source is within 1.5 m of a user. During the evaluation, the fluorescents lights were on, approximately 1.3 m above users' heads. The touch sensing system thus successfully segments touch input even with the present of the noise source.

Another limitation comes from the grounding condition of the user. If the user is in contact with a strong electrical ground (e.g. a laptop connected to AC power, a large metal object or a metal railing), more current can be shunted than normal. The resulting altered measurements can affect the touch point reported by the machine learning approach. To alleviate this problem, varying grounding conditions are used when training the global machine learning models.

The data processing system 106 draws 120 mA during normal operation (which includes 10 mA for the Bluetooth module). In some implementations, the power consumption can be lowered by reducing the duty cycle of the sensing.

For example, the sensor can enter a power saving mode (sensing infrequently and with lower resolution) to detect whether or not a finger is touching on the surface. Once it detects a finger, the touch sensing system 100 then turns on the full cross-sectional measurements for touch tracking.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively, or in addition, the program instructions can be encoded on a propagated signal that is an artificially generated signal, e.g., a machine-generated electrical, optical, or electromagnetic signal that is generated to encode information for transmission to suitable receiver apparatus for execution by a processing device. A machine-readable medium can be a machine-readable storage device, a machine-readable storage substrate, a random or serial access memory device, or a combination of one or more of them.

The term "processing device" encompasses apparatuses, devices, and machines for processing information, including by way of example a programmable processor, a computer, or multiple processors or computers. The apparatus can include special purpose logic circuitry, e.g., an FPGA (field programmable gate array) or an ASIC (application specific integrated circuit) or RISC (reduced instruction set circuit). The apparatus can also include, in addition to hardware, code that creates an execution environment for the computer program in question, e.g., code that constitutes processor firmware, a protocol stack, an information base management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or information (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input information and generating output. The processes and logic flows can also be performed by, and apparatus can also be implemented as, special purpose logic circuitry, e.g., an FPGA (field programmable gate array) or an ASIC (application specific integrated circuit) or RISC.

Computers suitable for the execution of a computer program include, by way of example, general or special purpose microprocessors or both, or any other kind of central processing unit. Generally, a central processing unit will receive instructions and information from a read only memory or a random access memory or both. The essential elements of a computer are a central processing unit for performing or executing instructions and one or more memory devices for storing instructions and information. Generally, a computer will also include, or be operatively coupled to receive information from or transfer information to, or both, one or more mass storage devices for storing information, e.g., magnetic, magneto optical disks, or optical disks. However, a computer need not have such devices. Moreover, a computer can be embedded in another device, e.g., a mobile telephone, a smartphone or a tablet, a touchscreen device or surface, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and information include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and (Blue Ray) DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as an information server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital information communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In another example, the server can be in the cloud via cloud computing services.

While this specification includes many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for determining a location of an input to an interface, the method comprising:
   generating, by a first pair of electrodes at a first location in a conductive material, an electric field in the conductive material;
   generating measurement data by measuring, by one or more second pairs of electrodes, the electric field in the conductive material at one or more second locations in the conductive material, with each of the one or more second locations differing from the first location;
   receiving data indicative of a baseline electric field in the conductive material;
   generating, based on the measurement data, an approximation of the electric field in the conductive material; and
   inputting, into a machine learning model, the data indicative of the baseline electric field and the approximation of the electric field;
   determining, by the machine learning model, whether electrical current is shunted from the conductive material based on the data indicative of the baseline electric field and the approximation of the electric field; and
   classifying, by the machine learning model based on determining whether the electrical current is shunted from the conductive material, one or more regions of the interface into a given state,
   wherein classifying the one or more regions comprises determining a location of a disturbance in the approximation of the electric field that causes the approximation of the electric field to diverge at the location of the disturbance from the baseline electric field.

2. The method of claim 1, further comprising:
   in response to generating the measurement data, selecting one of the one or more second pairs of electrodes for generating another electric field in the conductive material;
   generating additional measurement data, using the first pair of electrodes and the one or more second pairs of electrodes that were not selected; and
   combining the measurement data with the additional measurement data to generate cross-sectional measurement data;
   wherein the approximation of the electric field is based on the cross-sectional measurement data.

3. The method of claim 1, wherein generating the measurement data comprises a tomographic reconstruction of the electric field throughout the interface.

4. The method of claim 1, wherein classifying comprises applying a first regression model for a first dimension of the interface and applying a second regression model for a second dimension of the interface.

5. The method of claim 1, further comprising:
   determining the baseline electric field of the interface by obtaining the measurement data when the interface is not being touched.

6. The method of claim 1, wherein classifying the one or more regions comprises executing a neural network to perform operations comprising:
   receiving feature input data comprising the measurement data, wherein the feature input data each comprise a sample of the measurement data;
   receiving weights based on a calibration measurement of the conductive material, the weights each representing a value of the electric field in the conductive material at a location in the conductive material when the conductive material is not being disturbed;
   combining, at each stage of the neural network, each of the feature input data with one or more of the weights to generate output data; and
   applying a classifier to the output data.

7. The method of claim 1, wherein classifying the one or more regions comprises applying a classifier having a separate class representing each region of the one or more regions.

8. The method of claim 1, wherein classifying the one or more regions comprises executing a machine learning classifier.

9. The method of claim 1, wherein the conductive material comprises a surface coat material having a resistivity between 500Ω and 50MΩ.

10. The method of claim 1, wherein the conductive material comprises one of a carbon-loaded thermoplastic polymer, carbon-loaded silicone, or a carbon-loaded polymeric foil.

11. The method of claim 1, further comprising:
    multiplexing the first pair of electrodes and one or more second pairs of electrodes between a current generating state and a voltage measuring state.

12. The method of claim 1, further comprising:
    tracking, based on classifying, intermittent touch of the interface to approximate a continuous touch.

13. The method of claim 1, further comprising:
determining, based on classifying, that two or more regions of the interface are simultaneously in a touched state.

14. A touch responsive system comprising:
a conductive material forming a touch interface;
a plurality of electrodes affixed to the conductive material;
a multiplexing device configured to switch a state of electrodes of the plurality between a current-projecting functionality state and a voltage measuring functionality state;
a signal generator; and
one or more data processing devices configured to perform operations comprising:
  causing the multiplexing device to switch a pair of electrodes of the plurality from the voltage measuring functionality state to the current-projecting functionality state;
  controlling the signal generator to generate, via the pair of electrodes, an electric field in the conductive material;
  receiving data indicative of a baseline electric field in the conductive material;
  measuring, via one or more pairs of the electrodes of the plurality in the voltage measuring functionality state, one or more voltages representing the electric field in the conductive material to generate cross-sectional measurement data;
  reconstructing, based on the cross-sectional measurement data, an approximation of the electric field in the conductive material; and
  inputting, into a machine learning model, the data indicative of the baseline electric field and the approximation of the electric field;
  determining, by the machine learning model, whether a location of the touch interface is where electrical current is shunted from the conductive material based on a divergence between the data indicative of the baseline electric field and the approximation of the electric field at the location of the touch interface; and
  classifying, by the machine learning model based on determining whether the electrical current is shunted from the conductive material, one or more regions of the touch interface of the conductive material, the one or more regions including the location of the touch interface, into one of a touched state or a not-touched state.

15. The touch responsive system of claim 14, wherein the conductive material comprises a surface coat material having a resistivity between 500Ω and 50MΩ.

16. The touch responsive system of claim 14, wherein the conductive material comprises one of a carbon-loaded thermoplastic polymer, carbon-loaded silicone, or a carbon-loaded polymeric foil.

17. A device for performing touch sensing, the device comprising:
an interface comprising a plurality of electrodes and a conductive material; and
one or more processing devices in communication with the interface, the one or more processing devices configured to perform operations comprising:
  receiving measurement data obtained by measuring an electric field generated by a first pair of electrodes of the plurality of electrodes, the first pair of electrodes being at a first location in the conductive material;
  receiving data indicative of a baseline electric field in the conductive material;
  generating, based on the measurement data, an approximation of the electric field in the conductive material; and
  inputting, into a machine learning model, the data indicative of the baseline electric field and the approximation of the electric field;
  determining, by the machine learning model, whether electrical current is shunted from the conductive material based on the data indicative of the baseline electric field and the approximation of the electric field; and
  classifying, by the machine learning model based on determining whether the electrical current is shunted from the conductive material, one or more regions of the interface into a given state,
  wherein classifying the one or more regions comprises determining a location of a disturbance in the approximation of the electric field that causes the approximation of the electric field to diverge at the location of the disturbance from the baseline electric field.

18. The device of claim 17, wherein the operations further comprise:
in response to generating the measurement data, selecting a second pair of the plurality of electrodes for generating another electric field in the conductive material;
generating additional measurement data, using the first pair of electrodes; and
combining the measurement data with the additional measurement data to generate cross-sectional measurement data;
wherein the approximation of the electric field is based on the cross-sectional measurement data.

19. One or more non-transitory computer readable media storing instructions for determining a location of an input to an interface, the instructions, when executed by at least one processing device, being configured to cause the at least one processing device to perform operations comprising:
receiving measurement data obtained by measuring an electric field generated by a first pair of electrodes of the plurality of electrodes, the first pair of electrodes being at a first location in the conductive material;
receiving data indicative of a baseline electric field in the conductive material;
generating, based on the measurement data, an approximation of the electric field in the conductive material; and
inputting, into a machine learning model, the data indicative of the baseline electric field and the approximation of the electric field;
determining, by the machine learning model, whether electrical current is shunted from the conductive material based on the data indicative of the baseline electric field and the approximation of the electric field; and
classifying, by the machine learning model based on determining whether the electrical current is shunted from the conductive material, one or more regions of the interface into a given state,
wherein classifying the one or more regions comprises determining a location of a disturbance in the approximation of the electric field that causes the approximation of the electric field to diverge at the location of the disturbance from the baseline electric field.

20. The one or more computer readable media of claim 19, wherein the operations further comprise:

in response to generating the measurement data, selecting a second pair of the plurality of electrodes for generating another electric field in the conductive material;

generating additional measurement data, using the first pair of electrodes; and combining the measurement data with the additional measurement data to generate cross-sectional measurement data;

wherein the approximation of the electric field is based on the cross-sectional measurement data.

* * * * *